(12) United States Patent
Tanaka

(10) Patent No.: US 9,071,525 B2
(45) Date of Patent: Jun. 30, 2015

(54) DATA RECEIVING APPARATUS, DATA RECEIVING METHOD, AND PROGRAM STORAGE MEDIUM

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1264 days.

(21) Appl. No.: 12/404,616

(22) Filed: Mar. 16, 2009

(65) Prior Publication Data

US 2009/0248891 A1 Oct. 1, 2009

(30) Foreign Application Priority Data

Mar. 26, 2008 (JP) .................................. 2008-81097

(51) Int. Cl.
*G06F 15/16* (2006.01)
*H04L 12/801* (2013.01)
*H04L 12/807* (2013.01)
*H04L 12/861* (2013.01)

(52) U.S. Cl.
CPC .............. *H04L 47/10* (2013.01); *H04L 47/193* (2013.01); *H04L 47/27* (2013.01); *H04L 49/90* (2013.01); *H04L 49/9094* (2013.01)

(58) Field of Classification Search
CPC .... H04L 41/10; H04L 47/193; H04L 49/9094
See application file for complete search history.

(56) References Cited

U.S. PATENT DOCUMENTS

| 6,751,665 | B2 | 6/2004 | Philbrick et al. | |
|---|---|---|---|---|
| 7,293,100 | B2* | 11/2007 | Jayam et al. | 709/230 |
| 7,346,701 | B2 | 3/2008 | Elzur et al. | |
| 7,522,606 | B1* | 4/2009 | Sendrovitz | 370/394 |
| 7,573,884 | B2* | 8/2009 | Klimker et al. | 370/394 |
| 8,345,690 | B2* | 1/2013 | Kim et al. | 370/394 |
| 2003/0026277 | A1* | 2/2003 | Pate et al. | 370/412 |
| 2004/0013117 | A1* | 1/2004 | Hendel et al. | 370/394 |
| 2004/0022262 | A1* | 2/2004 | Vinnakota et al. | 370/429 |
| 2004/0044796 | A1 | 3/2004 | Vangal et al. | |
| 2004/0078462 | A1 | 4/2004 | Philbrick et al. | |
| 2005/0141443 | A1* | 6/2005 | Kim et al. | 370/312 |
| 2007/0206600 | A1* | 9/2007 | Klimker et al. | 370/394 |

* cited by examiner

*Primary Examiner* — Ranodhi Serrao
*Assistant Examiner* — Thomas Richardson
(74) *Attorney, Agent, or Firm* — Finnegan, Henderson, Farabow, Garrett & Dunner, L.L.P.

(57) ABSTRACT

An apparatus includes: a receiver which receives a data sequence; a specifying unit which specifies a temporary buffer area in a data storage and specifies a destination buffer area in the data storage; a first identifying unit which identifies a destination number range depending on a size of the specified destination buffer area so that the range follows a range that was last identified; a writing unit which writes data that falls within one of the ranges in an area in the destination buffer area that corresponds to the sequence number of that data, and writes data that does not fall within it in the temporary buffer area; a copying unit which reads out data falling within the identified range from the temporary buffer area and writes the read-out data in an area in the destination buffer area that is associated with the sequence number of that data.

15 Claims, 22 Drawing Sheets

DATA RECEIVING APPARATUS, DATA RECEIVING METHOD, AND PROGRAM STORAGE MEDIUM

CROSS REFERENCE TO RELATED APPLICATIONS

This application is based upon and claims the benefit of priority from the prior Japanese Patent Applications No. 2008-81097, filed on Mar. 26, 2008; the entire contents of which are incorporated herein by reference.

BACKGROUND OF THE INVENTION

1. Field of the Invention

The present invention relates to a data receiving apparatus, data receiving method, and program storage medium for receiving data transmitted over a network using a predetermined protocol.

2. Related Art

TCP/IP is one of major protocols used in Internet communication. Conventional TCP/IP is realized mainly through software processing and implemented by a CPU in a personal computer or an embedded device, for example. In such a case, data from a network is received using a Network Interface Card (NIC), and received frames are once written in a stack buffer of memory by the NIC itself or the CPU and subsequently subjected to protocol processing by protocol stack software of the CPU. The CPU is typically performing application processing in addition to protocol processing, and the data is copied to an application buffer specified by an application after protocol processing is performed. The stored data is read out by the application or the like. This flow of data is illustrated in FIG. 31.

In this scheme, however, received data is once buffered while it moves from the NIC to the application buffer, meaning the data makes two roundtrips across the memory in total. To address this, U.S. Patent Publication No. 2004-0078462 discloses a scheme for directly writing data in an application buffer from a NIC by performing part of protocol processing in the NIC. Data flow in this scheme is as shown in FIG. 32. In this arrangement, the data flow makes only one roundtrip across the memory and it is thus possible to avoid overhead in terms of performance and power consumption associated with data copy.

However, such problems as follows would be encountered when the technique of U.S. Patent Publication No. 2004-0078462 is used as it is:

(1) Application Problem

A typical application program is often run using a socket API. An approach often used in such a case is to wait for reception of data in a select( ) function, for example, and call a recv( ) function upon verification of reception. An application specifies an address in an application buffer and a protocol processing unit writes data at the specified address, but in this approach the application notifies the address through a recv( ) function. Accordingly, when such an application is to be handled, data has to be once buffered on the way because it is required to receive data without an application buffer specified, that is to say, with no application buffer being present.

(2) Performance Problem

Even if reception is awaited in "recv( )", data cannot be received because there is no application buffer until a recv( ) call returns after data reception and the next recv( ) call is called, making data reception intermittent as shown in FIG. 33 and degrading performance.

(3) Window Size Notification Problem

The U.S. Patent Publication No. 2004-0078462 describes a scheme for informing the other party of the size of a receive window as the size of the application buffer, but actually a larger size has to be informed as described below.

When a window scaling option is used, a window size for notification must be specified as a multiple of 2nth power (n>=1). Thus, a size larger than the application buffer has to be informed.

Since the transmitting side refrains from data transmission when the receive window size has dropped below Maximum Segment Size (MSS) according to Silly Window Syndrome avoidance algorithm of TCP, it is necessary to inform a window size that is larger at least by MSS.

When a larger window size is informed, the other party may transmit data larger than the application buffer size. If data overflowing the application buffer is not buffered, it will be necessary to have the other party retransmit the data when the next application buffer is specified. On the transmitting side of TCP, retransmission reduces a congestion window size and significantly lowers throughput. Thus, to prevent such retransmission, the overflowing data has to be somehow buffered.

As outlined above, the technique of U.S. Patent Publication No. 2004-0078462 gives rise to at least one of the problems (1) to (3). Data buffering is desired for avoiding these problems, but U.S. Patent Publication No. 2004-0078462 does not disclose a method therefor.

That is to say, when the conventional software-based scheme described above first is applied, buffering is performed and thus the problems (1) to (3) do not arise. However, overhead associated with copying occurs all the time. When the technique of U.S. Patent Publication No. 2004-0078462 is in turn used to avoid such overhead associated with copying, the problems (1) to (3) will be encountered.

ABSTRACT

According to an aspect of the present invention, there is provided with a data receiving apparatus, comprising:

a receiving unit configured to receive via a network a data sequence which is a series of data with which a sequence number is each associated;

a data storage configured to store data;

a first specifying unit configured to specify a temporary buffer area in the data storage for temporarily storing data included in the data sequence;

a second specifying unit configured to specify a destination buffer area in the data storage for storing data included in the data sequence;

a first identifying unit configured to, when the destination buffer area is specified by the second specifying unit, identify a destination number range depending on a size of the specified destination buffer area so that the destination number range follows a destination number range that was last identified, each sequence number included in an identified destination number range being assigned to a position in the specified destination buffer area that corresponds to a relative position of the sequence number within the identified destination number range;

a data writing unit configured to, when the data sequence has been received by the receiving unit, write data that falls within one of destination number ranges which has been identified by the first identifying unit in an assigned position in the destination buffer area that corresponds to the sequence number of that data, and write data that does not fall within any of the destination number ranges in the temporary buffer area; and a data copying unit configured to, when the destination buffer area is specified by the second specifying unit, read out data, from the temporary buffer area, that has a sequence number which falls within the destination number range identified in response to specification of the destination buffer area and write the read-out data at an assigned position in the destination buffer area that corresponds to the sequence number of the read-out data.

DETAILED DESCRIPTION OF THE INVENTION

First Embodiment

Figure 1:
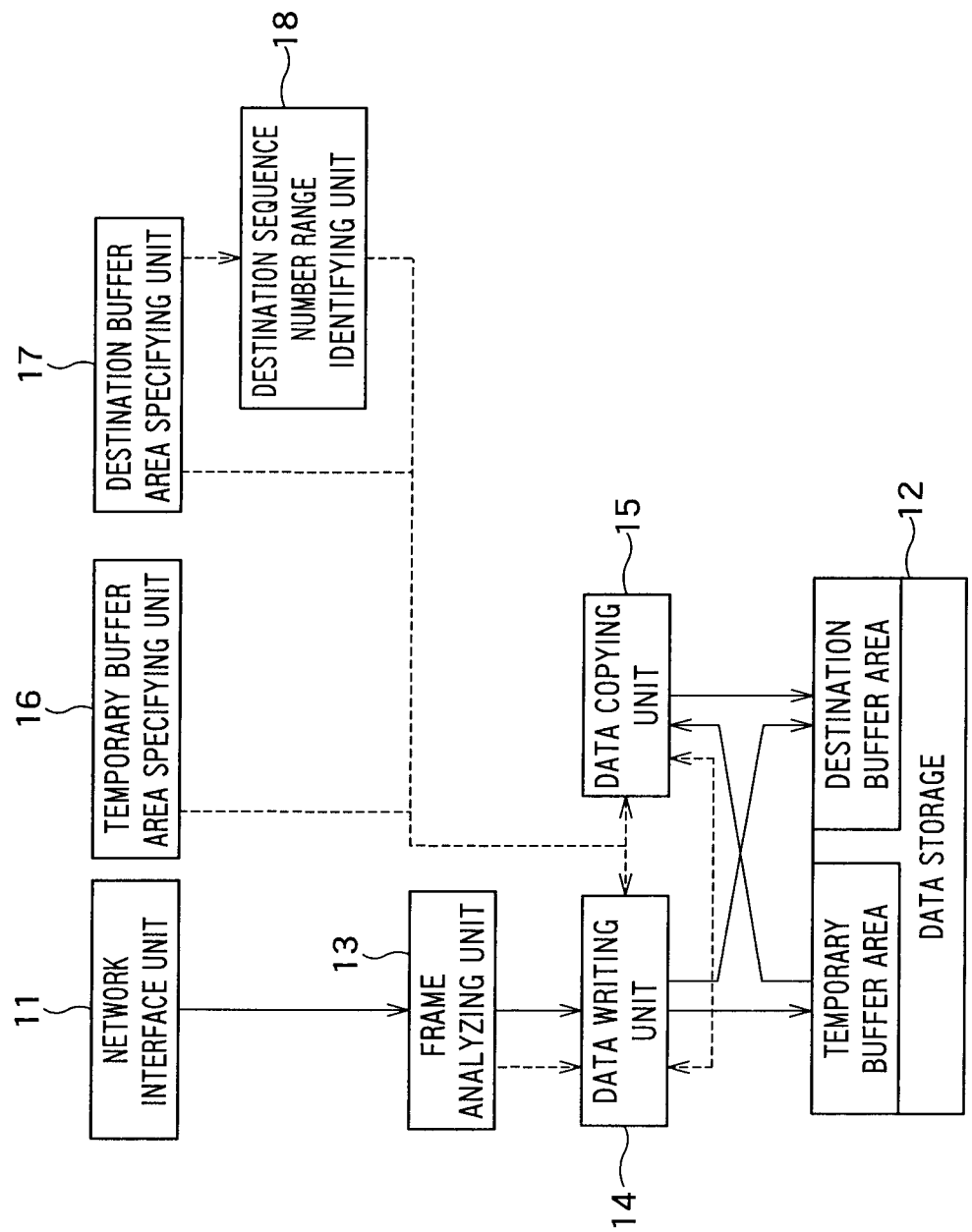
FIG. 1 shows a configuration of a data receiving apparatus according to a first embodiment.

FIG. 1 shows a configuration of a data receiving apparatus according to a first embodiment of the present invention.

The data receiving apparatus includes a network interface unit 11, a data storage 12, a frame analyzing unit 13, a data writing unit 14, a data copying unit 15, a temporary buffer area specifying unit (a first specifying unit) 16, a destination buffer area specifying unit (a second specifying unit) 17, and a destination sequence number range identifying unit (a first identifying unit) 18.

The network interface unit 11 receives frames from a network. The network may be a network in which TCP/IP communication is performed, such as the Internet, and the network interface unit 11 receives frames for an Ethernet and/or a wireless LAN.

The data storage 12 has a data area for storing data.

The frame analyzing unit 13 analyzes Ethernet, IP, and TCP headers of a received frame and takes a TCP data portion (a data sequence) excluding the headers. With each byte of TCP data (a data sequence), a sequence number is associated.

The temporary buffer area specifying unit 16 specifies a temporary buffer area in the data storage 12 for temporarily storing data (TCP data) taken by the frame analyzing unit 13.

The destination buffer area specifying unit 17 may be a software application (an application capable of TCP processing), for example, and specifies a destination buffer areas in the data storage 12 multiple times in which TCP data taken by the frame analyzing unit 13 should be written. A destination buffer area is represented by the start and end addresses of the area, or a start address and a length, for example. In a socket API, for example, a destination buffer area is addressed through a recv( ) call or the like. A destination buffer area is specified every time data writing to a destination buffer area that was last specified is completed, for instance.

When a destination buffer area has been specified by the destination buffer area specifying unit 17, the destination sequence number range identifying unit 18 identifies a sequence number range (i.e. destination sequence number range or destination number range) corresponding to the specified destination buffer area so that the range follows the last sequence number range that was specified. Each sequence number in the sequence number range identified is assigned to a position (i.e. address or area part) in the specified destination buffer area that is at an offset corresponding to the relative position of that number in the destination sequence number range (destination number range). The reference for offsetting may be the start address of a specified destination buffer area, for example.

The data writing unit 14 writes TCP data taken through analysis by the frame analyzing unit 13 either in a temporary or destination buffer area. Specifically, of the data taken (a data sequence), the data writing unit 14 writes data that falls within the identified destination sequence number range at a position (an address) in the destination buffer area that corresponds to the sequence number of the data and data that falls outside the identified destination sequence number range in a temporary buffer area.

The data copying unit 15 copies data written in a temporary buffer area to a destination buffer area. More specifically, when a destination buffer area is specified by the destination buffer area specifying unit 17, the data copying unit 15 reads any data that falls within a sequence number range newly identified by the destination sequence number range identifying unit 18 out of data stored in the temporary buffer area, and writes the read-out data in a position (an area part) of the destination buffer area that corresponds to the sequence number of that data.

Hereinafter, operations of the data receiving apparatus of FIG. 1 are described in detail using specific examples.

Figure 5:
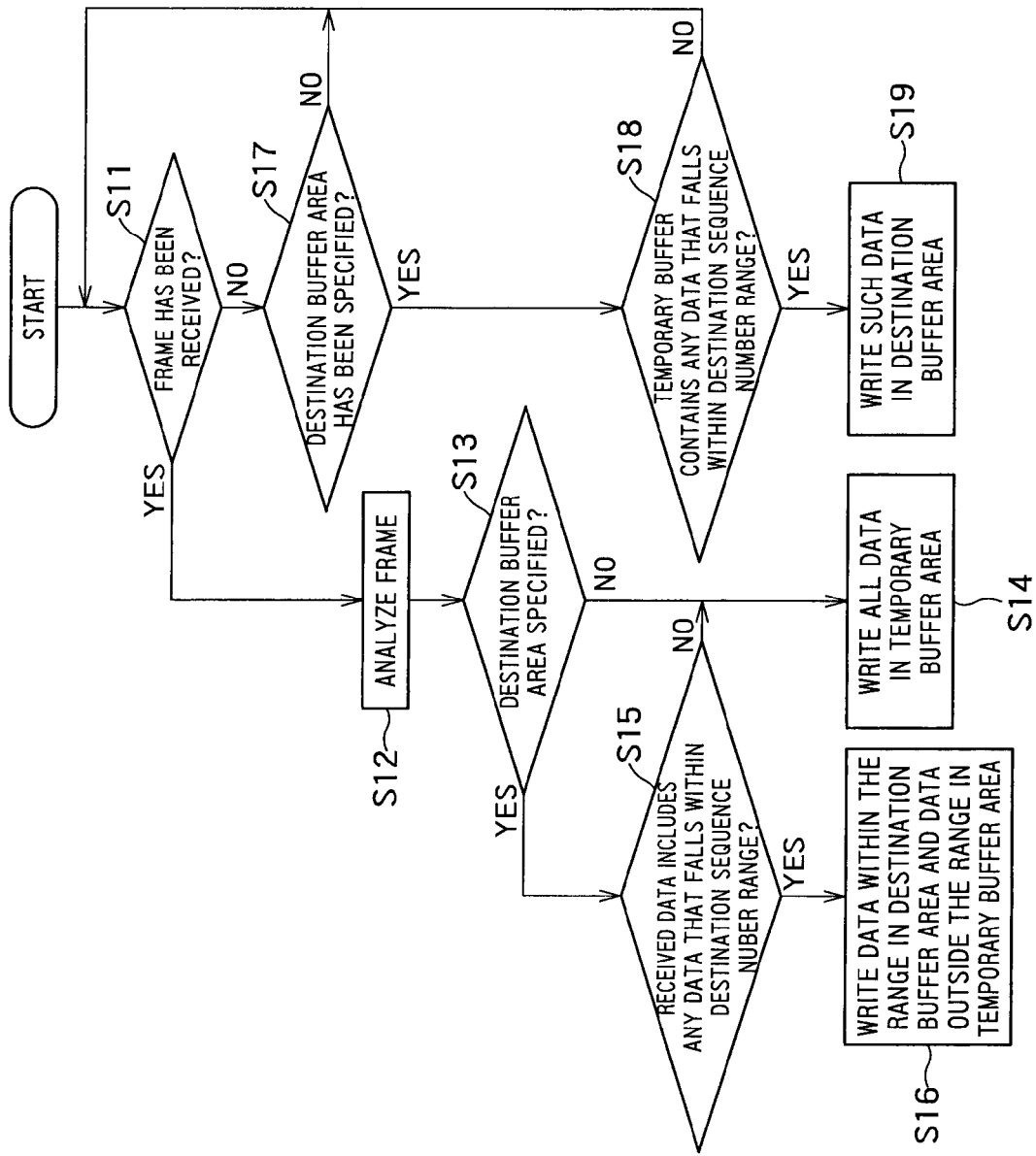
FIG. 5 is a flowchart illustrating an example flow of processing performed by the data receiving apparatus of the first embodiment.

FIG. 5 is a flowchart illustrating an exemplary flow of processing performed by the data receiving apparatus of FIG. 1.

First, it is determined whether a frame (e.g., an Ethernet frame) has been received from a network by the network interface unit 11 (S11). If a frame has been received (YES at S11), the frame analyzing unit 13 analyzes the Ethernet, IP, and TCP headers of the frame (S12). As a result of analysis, the data writing unit 14 writes the TCP data portion except the headers in a temporary buffer area or a destination buffer area of the data storage 12 (S13 to S16). Steps S13 to S16 will be described in greater detail below.

As mentioned above, a sequence number is associated with each byte of TCP data. The sequence number of the initial data can be identified as a number that follows that of a synchronization (SYN) segment which is transmitted from the other party at the time of connection establishment. For example, when the sequence number of the initial synchronization segment is 0, the sequence number of the first data that will be transmitted next is 1. The data receiving apparatus learns that the sequence number of the initial data will be 1 by receiving a synchronization segment with a sequence number of 0 and thus recognizes that the initial data has been received when a subsequently received frame has sequence number 1. The sequence number of data that will be received next is the sum of the sequence number of the beginning data of the initial frame and the data length of the initial frame. For example, when the data length is 1460, the sequence number of the next data is 1461. Since data packets of IP communication can arrive at the other party with change in their sequence on the way, exchange of data indicated by sequence numbers enables the receiving side to detect change in sequence and/or loss of data and thus rearrange the packets in a correct order or ask the sending side for retransmission.

When the destination buffer area specifying unit 17 has specified a destination buffer area, the destination sequence number range identifying unit 18 identifies a range from the initial sequence number mentioned above plus the length of that area as a destination sequence number range. In other words, as data starting at the initial data and having the length of the area should be written in the destination buffer area, the sequence number range of the area is identified. For example, when the destination buffer area is from 0x80000000 to 0x80000fff, its length is 4096 (0x1000), so the destination sequence number range is from 1 to 4096.

If a destination buffer area is not specified when data is received (NO at S13), the data writing unit 14 first stores all data in a temporary buffer area. For example, when the data length of received data is 1460(0x05b4) and the temporary buffer area is specified at 0x70000000 to 0x7000ffff, the data is stored at 0x70000000 to 0x700005b3.

If a destination buffer area is specified (YES at S13), assuming that its address is from 0x80000000 to 0x80000fff as mentioned above, for example, the destination sequence number range is from 1 to 4096 and the sequence numbers of the received data from 1 to 1460 all fall within the range, thus the data is all written in the destination buffer area (YES at S15, and S16). That is, the data is stored at 0x80000000 to 0x800005b3.

However, if the address of the destination buffer area is from 0x80000000 to 0x800000ff, for example, the length of the destination buffer area is 256 (0x100) and accordingly the destination sequence number range is from 1 to 256. As the received data has sequence numbers from 1 to 1460, data with sequence numbers from 1 to 256, which is the first 256 bytes, is written in the destination buffer area at 0x80000000 to 0x800000ff and the remaining 1204 (0x04b4) bytes is written in a temporary buffer area (YES at S15, and S16). In this case, data with sequence numbers from 257 to 1460 is written at 0x70000000 to 0x700004b3, for example.

Then, if it is determined at step S11 that no frame has been received (NO at S11), it is determined whether a destination buffer area has been specified (S17). If a destination buffer area has not been specified (NO at S17), the flow returns to step S11. If a destination buffer area has been specified (YES at S17), it is determined whether the temporary buffer area contains any data whose sequence number falls within the destination sequence number range that has been newly identified (S18). If no such data is present, the flow returns to step S11 with nothing performed.

On the other hand, if data has been already received and such data is stored in the temporary buffer area, the data copying unit 15 reads data which falls within the newly identified destination sequence number range out of the data stored in the temporary buffer area, and writes the read-out data in the destination buffer area (S19).

For example, when data with sequence numbers from 1 to 4096 is buffered in a temporary buffer area at 0x70000000 to 0x70000fff, if a destination buffer area is newly specified at 0x80000000 to 0x800000ff, the length of the buffer is 256 (0x100), so the data copying unit 15 takes data having sequence numbers from 1 to 256 from the data in the temporary buffer area and copies it to the destination buffer area. When the destination buffer area is specified at 0x80000000 to 0x8000ffff, its length is 65536 (0x10000) and accordingly the destination sequence number range is from 1 to 65536. Therefore, sequence numbers from 1 to 4096 of the data in the temporary buffer area all fall within the range and all the data is copied to the destination buffer area at 0x80000000 to 0x80000fff. In the remaining area from 0x80001000 to 0x8000ffff of the destination buffer area, data having sequence numbers from 4097 to 65536 which is going to be newly received from the network later will be directly written.

In IP communication, transmitted data may not reach the receiving side in a correct order. In such a situation, received data is written in the destination buffer area with an offset corresponding to its sequence number, not in order of reception, so as to be written in order of sequence number. When a destination buffer area is specified at 0x80001000 to 0x8000ffff and its sequence number range is from 4097 to 65536 as mentioned above, frames of data starting at sequence number 4097 is expected to be received next, but frames of data having sequence numbers from 5557 to 7016, for example, may be actually received. In this case, the data is written in an area starting at 0x80001000+(5557−4097) =0x800015b4, instead of an area starting at 0x80001000. When the length of the data is 1460 (0x05b4), the data is written at 0x800015b4 to 0x80001b67. If data with sequence numbers 4097 to 5556 that has arrived late is thereafter received, the data is written at 0x80001000 to 0x800015b3. Consequently, the data having sequence numbers from 4097 to 7016 is correctly written at 0x80001000 to 0x80001b67 in order. In this manner, rearrangement of data is realized. Retransmission with frame loss is handled in a similar manner to delayed arrival. Delivery with overlapping frames poses no problem because the same data is simply overwritten at the same position.

If a destination buffer area is next specified at 0x90000000 to 0x90000fff after the data having sequence numbers from 1 to 65536 is written in the destination buffer area at 0x80000000 to 0x8000ffff, a destination sequence number range is identified so that it follows the previous range. That is to say, as the length is 4096(0x1000) and 65537+4096−1=69632, the destination sequence number range is from 65537 to 69632. Subsequent operations are similar.

In TCP, acknowledgement is performed at the time of data reception. Acknowledgement is performed for received data written in a temporary buffer area just as for received data written in a destination buffer area. However, since the temporary buffer area is also finite, it is possible that the temporary buffer area runs short and data reception becomes impossible. In such a situation, data may be simply discarded and acknowledgement may not be performed (i.e., wait for retransmission), for example. In TCP, however, the size of a receive buffer can be indicated to the other party as a window size. Thus, by informing the other party of the sum of the size of the destination buffer area and that of the temporary buffer area, it is possible to prevent data from being transmitted up to the point when the temporary buffer area overflows. More specifically, when a destination buffer area has been specified, the sum of the size of the destination buffer specified and the size of an available area in the temporary buffer area (alternatively, the sum of the size of an available area in a destination buffer after copy is performed upon specification of a destination buffer area and that of the temporary buffer area) is indicated to the other party as the size of the receive buffer. The data receiving apparatus according to the present embodiment may have a receive buffer size informer (a buffer size informer) for informing the total size.

Through such operations, temporary buffering of received data as much as needed can be performed and received data can be directly written in the destination buffer area when buffering is not required. That is to say, by having the temporary buffer area, the problems (1) to (3) described in Related Art can be solved, and furthermore, by minimizing the use of the temporary buffer area by writing in the destination buffer area whenever data can be directly written in the destination buffer area, copying can be avoided to the extent possible, which can realize improved performance and reduced power consumption.

Second Embodiment

While the first embodiment described basic operations for writing data in the destination buffer area, it is sometimes desired to detect completion of writing of all data in the destination buffer area, namely completion of data reception. A second embodiment shows a mode for realizing such detection.

Figure 2:
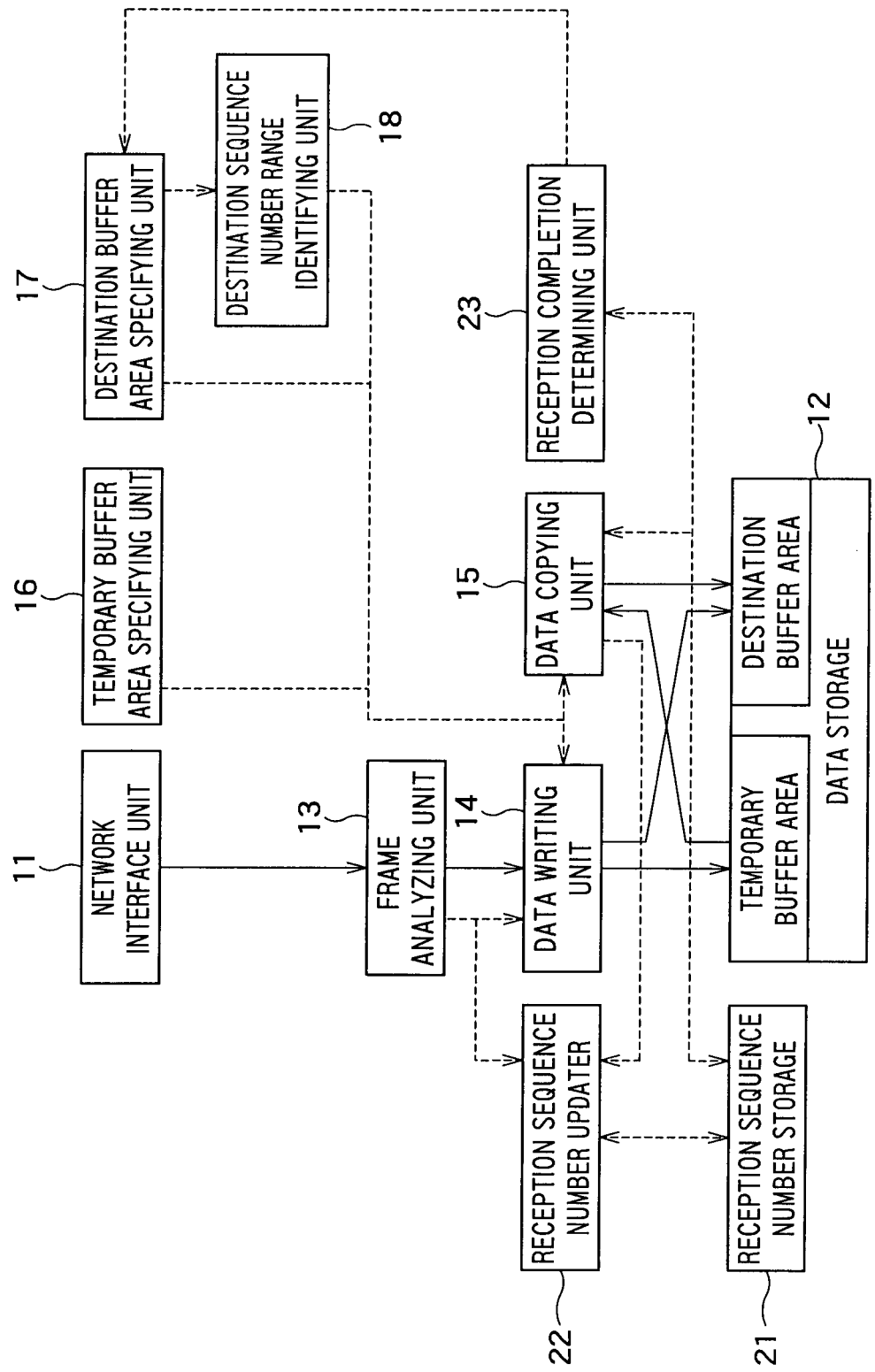
FIG. 2 shows a configuration of a data receiving apparatus according to a second embodiment.

FIG. 2 shows a configuration of a data receiving apparatus according to the second embodiment of the invention. In FIG. 2, elements of the same name as those in FIG. 1 are denoted with the same reference numerals and descriptions of them are omitted except for extended processing.

The data receiving apparatus of FIG. 2 includes a reception sequence number storage (a sequence number storage) 21 for memorizing data of which sequence numbers has been received, a reception sequence number updater (a sequence number updater) 22 for updating reception sequence numbers in the reception sequence number storage 21, and a reception completion determining unit (a determining unit) 23 for determining completion of reception, in addition to the components of FIG. 1. The data copying unit 15 uses information in the reception sequence number storage 21 to identify data to copy.

Figure 6:
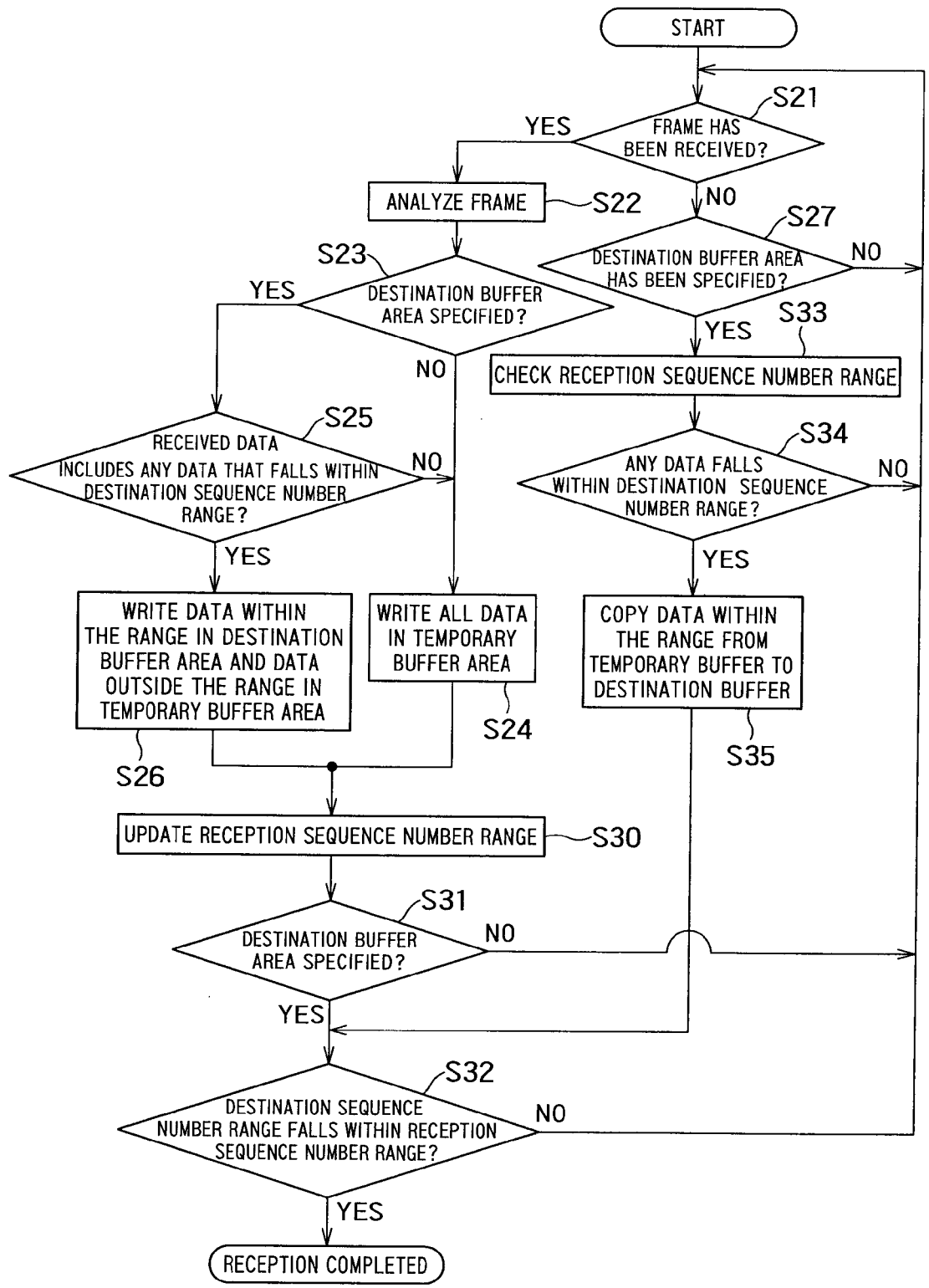
FIG. 6 is a flowchart illustrating an example flow of operations performed by the data receiving apparatus of the second embodiment.

FIG. 6 is a flowchart illustrating the operational flow of the data receiving apparatus of FIG. 2.

First, it is assumed that a connection has been established with the other party of communication and the initial sequence number is set to 10000 through exchange of synchronization segments. It is also assumed that a destination buffer area is specified and a destination sequence number range is set to 10000 through 14999. As data is not necessarily received in order in IP communication, the reception sequence number storage 21 can also store discrete reception sequence numbers. The reception sequence number storage 21 manages discrete reception sequence numbers in a data structure having a list structure, which is called reception sequence number range information (or reception range information). This reception sequence number range information is updated by the reception sequence number updater 22 every time data is received.

Figure 9:
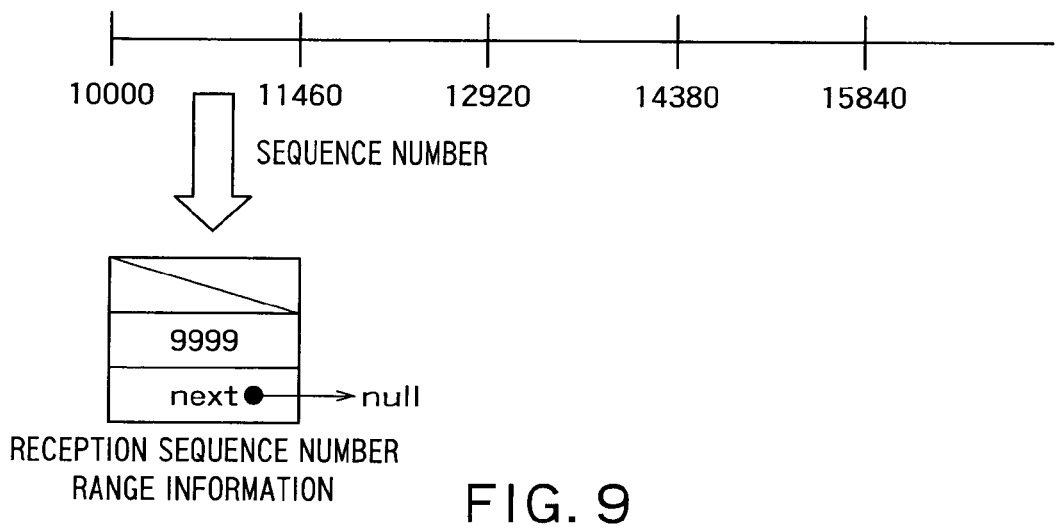
FIG. 9 illustrates the operations of the data receiving apparatus according to the second embodiment.

FIG. 9 shows reception sequence number range information as of when no data has been received yet after connection establishment. The reception sequence number range information is made up of three elements: a start sequence number, an end sequence number, and the address of next reception sequence number range information. However, the start sequence number of the first reception sequence number range information may be omitted as shown because it need not be specifically stored. Also, at this point in time, nothing has been received yet and reception of data starting at sequence number 10000 is expected, which is equivalent to when data up to sequence number 9999 has been received. Accordingly, reception sequence number range information is represented as shown in the figure for convenience. This is why the end sequence number is 9999 in the figure. Pointing to "null" from "next" means that there is no more reception sequence number range information.

Figure 10:
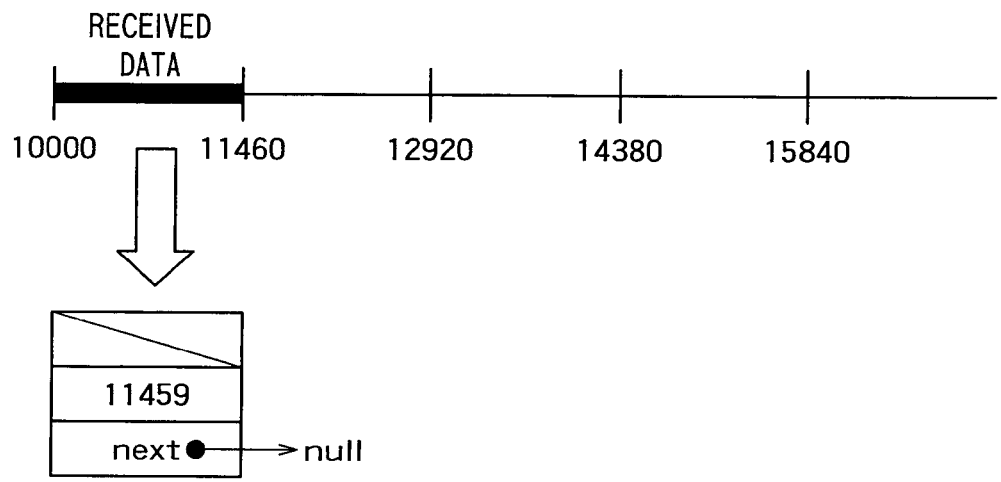
FIG. 10 illustrates the operations of the data receiving apparatus according to the second embodiment.

Data is transmitted in 1460-byte blocks, for example, and data having sequence numbers from 10000 to 11459 is first received (YES at S21). Then, the reception sequence number updater 22 updates the reception sequence number range information in the reception sequence number storage 21. FIG. 10 shows information after update, indicating data up to sequence number 11459 has been received (S22 to S30).

When the reception sequence number range information has been thus updated, the reception completion determining unit 23 checks whether the destination sequence number range falls within in any piece of the reception sequence number range information (YES at S31, and S32). This check may be done by seeing whether the end sequence number of the first reception sequence number range information is equal to or greater than that of the destination sequence number range, for example. Since the end sequence number 11459 of the first reception sequence number range information is not greater than the end number 14999 of the destination sequence number range in this stage, the reception completion determining unit 23 does not determine that reception is completed (NO at S32).

Figure 11:
FIG. 11 illustrates the operations of the data receiving apparatus according to the second embodiment.

When data with sequence numbers from 11460 to 12919 has been newly received (YES at S21), the reception sequence number range information now indicates that data up to 12919 has been received as shown in FIG. 11 (S22 to S30). The reception completion determining unit 23 still does not determine that reception is completed because the end sequence number 12919 of the first reception sequence number range information is not greater than the end number 14999 of the destination sequence number range (YES at S31 and NO at S32).

Figure 12:
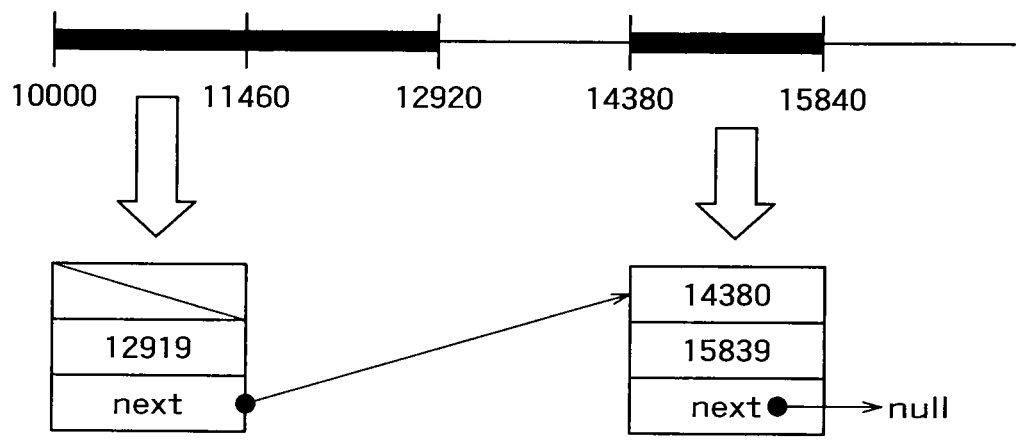
FIG. 12 illustrates the operations of the data receiving apparatus according to the second embodiment.

When data with sequence numbers from 14380 to 15839 is further received (YES at S21), sequence numbers 14380 to 15839 are newly added as the second reception sequence number range information as shown in FIG. 12 (S22 to S30). The reception completion determining unit 23 still does not determine that reception is completed in this stage because the end number 12919 of the first reception sequence number range information is not greater than the end number 14999 of the destination sequence number range (YES at S31 and NO at S32).

Figure 13:
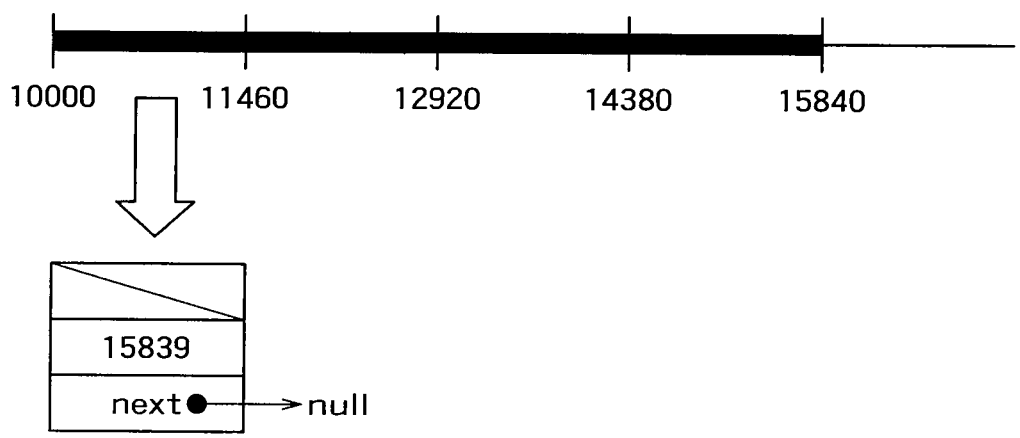
FIG. 13 illustrates the operations of the data receiving apparatus according to the second embodiment.

When data having sequence numbers from 12920 to 14379 is further received (YES at S21), the first reception sequence number range information and the second reception sequence number range information merge to indicate that data up to sequence number 15839 has been received as shown in FIG. 13 (S22 to S30). Then, the reception completion determining unit 23 determines that reception is completed at this point as the end number 15839 of the first reception sequence number range information is greater than the end number 14999 of the destination sequence number range (YES at S31 and YES at S32). When it is determined that reception is completed, the reception completion determining unit 23 informs the destination buffer area specifying unit 17 of the completion. There is no destination buffer area again until a destination buffer area is newly specified later by the destination buffer area specifying unit 17.

While the example above shows merging of consecutive sequence number range information, pieces of information may not be necessarily merged and may be saved as discrete pieces of information. However, merging can save the amount of memory required for storing reception sequence number range information and also simplify processing because only the end sequence number of the first reception sequence number range information has to be checked in determination of reception completion by the reception completion determining unit 23. When merging is not performed, determination of reception completion checks multiple pieces of reception sequence number range information to sequentially see whether all of the sequence numbers in the destination sequence number range fall within the reception sequence number range.

Also, the data structure of reception sequence number range information does not have to be a list structure and may be other structure such as table structure (or array structure). The point here is to store discrete range information and the data structure therefor does not matter.

Now, we describe a case where a frame is received after connection establishment and before a destination buffer area is specified in FIG. 6.

If a frame is received without a destination buffer area specified (YES at S21, S22, and NO at S23), all data in the frame is stored in the temporary buffer area (S24), and the reception sequence number updater 22 updates the reception sequence number range information in the reception sequence number storage 21 as in the previous example (S30). However, when a destination buffer is not specified, the reception completion determining unit 23 does not perform determination of reception completion after the updating (NO at S31).

Figure 14:
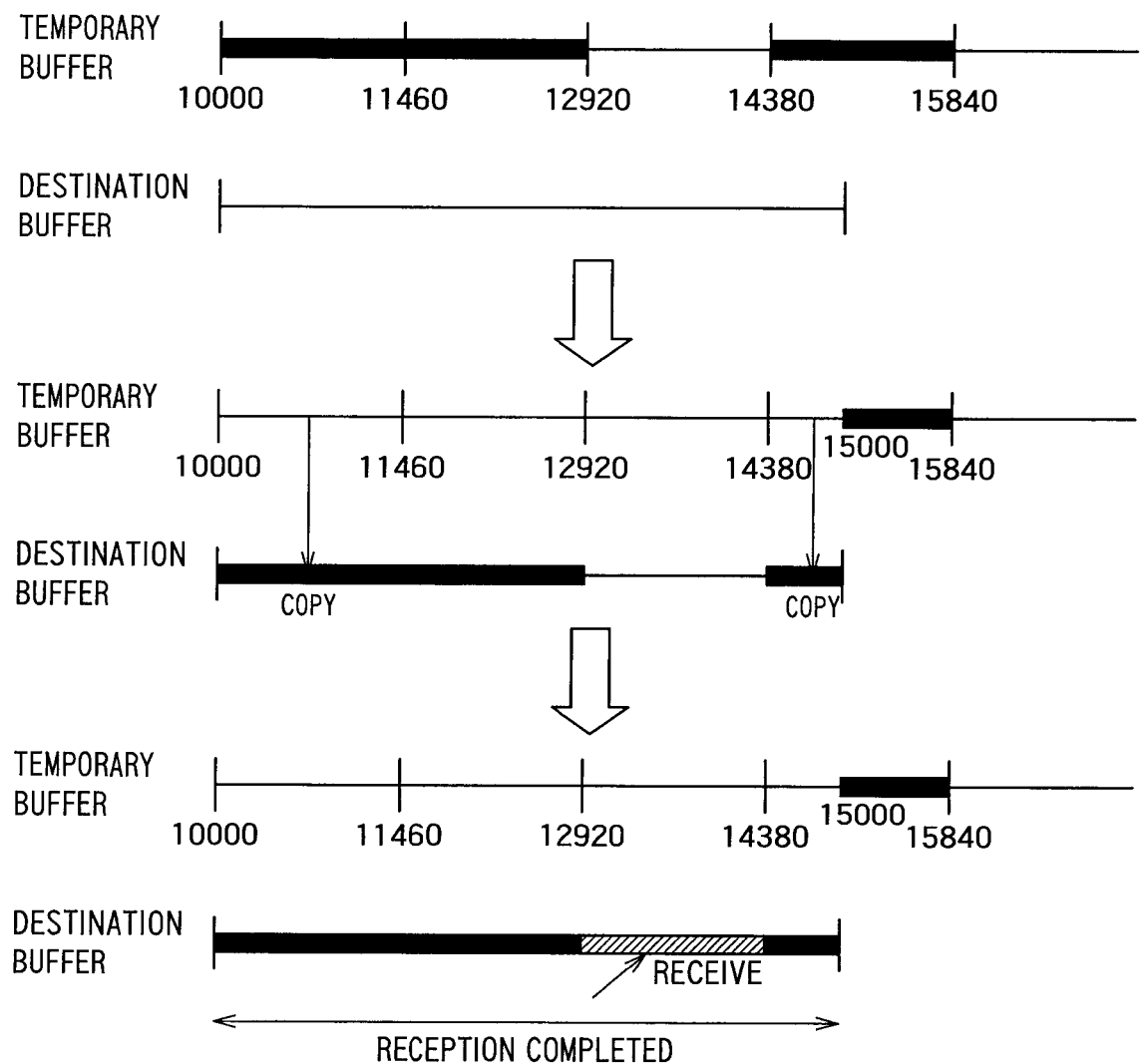
FIG. 14 illustrates the operations of the data receiving apparatus according to the second embodiment.

When a destination buffer area is subsequently specified (YES at S27) and a destination sequence number range is identified, the reception sequence number range information in the reception sequence number storage 21 is first checked (S33), and it is checked which data is being stored in the temporary buffer area (S34). Then, if there is any data that falls within the destination sequence number range (YES at S34), that data is copied to the destination buffer area (S35), and after completion of copy, the reception completion determining unit 23 determines whether reception is completed (S32). If no data falls within the destination sequence number range (NO at S34), nothing is performed and reception of data is awaited. Operations in a case where a destination buffer area is specified in the situation shown in FIG. 12, for example, and remaining data is later received and completion of reception is determined are illustrated in FIG. 14.

With such operations in the present embodiment as described above, completion of reception can be correctly determined.

Now, we describe how the temporary buffer area specifying unit 16 allocates a temporary buffer area.

Figure 16:
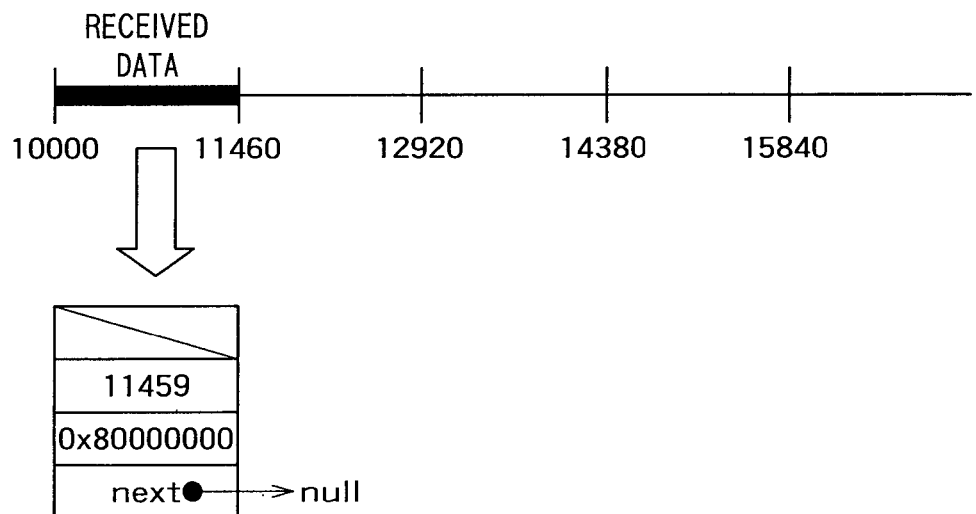
FIG. 16 illustrates a scheme for allocating a temporary buffer area (a first method)
Figure 17:
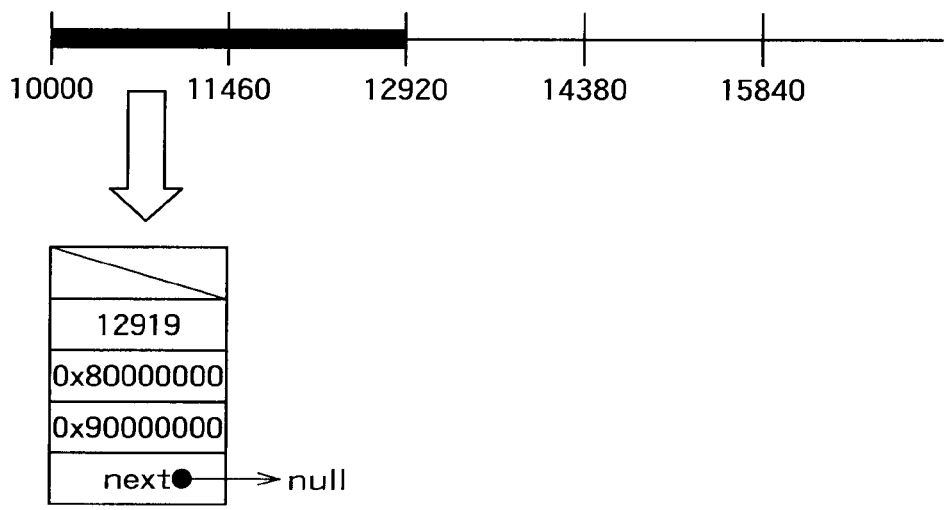
FIG. 17 illustrates a scheme for allocating a temporary buffer area (the first method)
Figure 18:
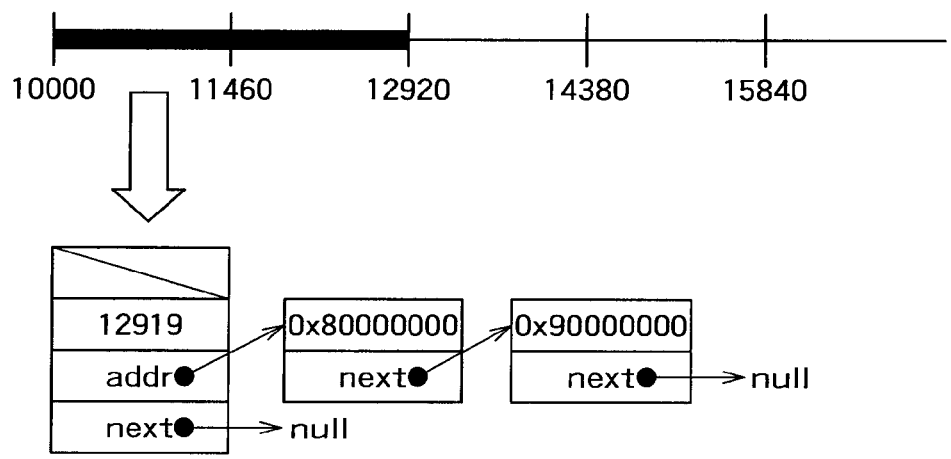
FIG. 18 illustrates a scheme for allocating a temporary buffer area (the first method)

One way is to allocate a storage area separately for each frame (a first method). To be specific, the temporary buffer area specifying unit 16 allocates 32 1500-byte areas (or partial areas), for example, and the data writing unit 14 stores a frame of received data in each of the 32 areas (partial areas). Here, the addresses of the areas have to be stored in association with reception sequence number range information. For example, when data having sequence numbers from 10000 to 11459 is received and stored at 0x80000000 in the temporary buffer area as shown in FIG. 10, this address is stored in association as shown in FIG. 16. Then, when data of sequence numbers from 11460 to 12919 is further received and stored at 0x90000000 in the temporary buffer area as shown in FIG. 11, the address is stored in association as shown in FIG. 17. When reception sequence number range information for multiple frames is merged as in FIG. 17, it is necessary to store multiple pieces of address information for associated temporary buffer areas. Thus, such multiple pieces of information may be stored in a list format being associated with each other as shown in FIG. 18. As the number of partial areas is finite, a partial area from which data has been copied to a destination buffer area is released, for example, and reused.

Another way to allocate a temporary buffer area by the temporary buffer area specifying unit 16 (a second method) is to store data in a single buffer in order of sequence number as in the destination buffer area. That is, a sequence number range is identified also for the temporary buffer area just as for the destination buffer area, and data is written at an offset position with respect to the sequence number range so as to write data in order of sequence number in the temporary buffer area. The configuration of the data receiving apparatus for this case is shown in FIG. 3.

Figure 3:
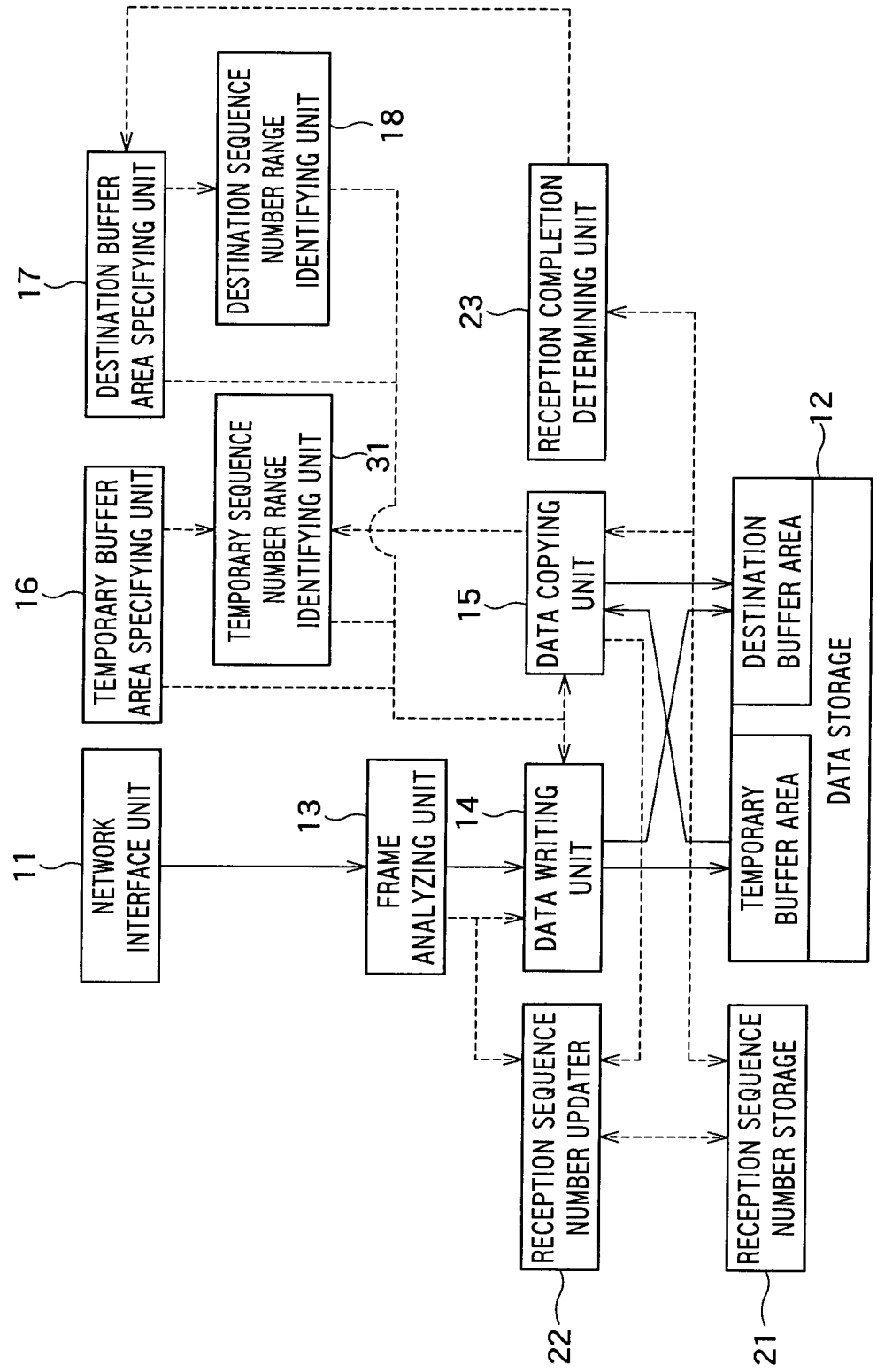
FIG. 3 shows another configuration of a data receiving apparatus according to a second embodiment.

The data receiving apparatus of FIG. 3 has a temporary sequence number range identifying unit (a second identifying unit) 31 that determines a corresponding sequence number range for a temporary buffer area just as for a destination buffer area. For example, assuming that the temporary buffer area specifying unit 16 specifies a temporary buffer area of 64 Kbytes starting at 0x80000000, namely 0x80000000 to 0x8000ffff, when sequence numbers start at 10000, the temporary sequence number range identifying unit 31 identifies a sequence number range that corresponds to this temporary buffer area as 10000 to 75535 (the length 64K=65536, 75535=10000+65536−1). Using this information, an address area can be identified from the offset between sequence numbers, e.g., in a case shown in FIG. 12, data having sequence numbers from 10000 to 12919 is at 0x80000000 to 0x80000b67 (0x0b67=2919), data having sequence numbers 14380 to 15839 is at 0x8000111c to 0x800016cf (0x111c=4380, 0x16cf=5839), and so on. That is to say, this method eliminates the necessity to store an address in the temporary buffer area for each frame data as in FIGS. 16 to 18, which were described in the previous method, thus memory area can be saved and/or processing can be simplified.

The temporary buffer area in this case is preferably a ring buffer, for example. As a specific example, suppose that when the temporary buffer area is from 0x80000000 to 0x8000ffff, a destination buffer area is specified and a destination sequence number range of sequence numbers from 10000 to 14999 is identified, and also data copy from 0x80000000 through 0x80001387 in the temporary buffer area is completed. In this situation, the temporary buffer from 0x80000000 to 0x80001387 (0x1387=4999) is released as it will be no longer used to allow data write following 0x8000ffff. That is, an area from 0x80001388 to 0x8000ffff and an area from 0x80000000 to 0x80001387 become new 64 Kbyte-areas in this order. At this point, however, the temporary sequence number range (or temporary number range) is also updated to follow the destination sequence number range, i.e., 15000 to 80535 (80535=15000+65536−1).

Figure 19:
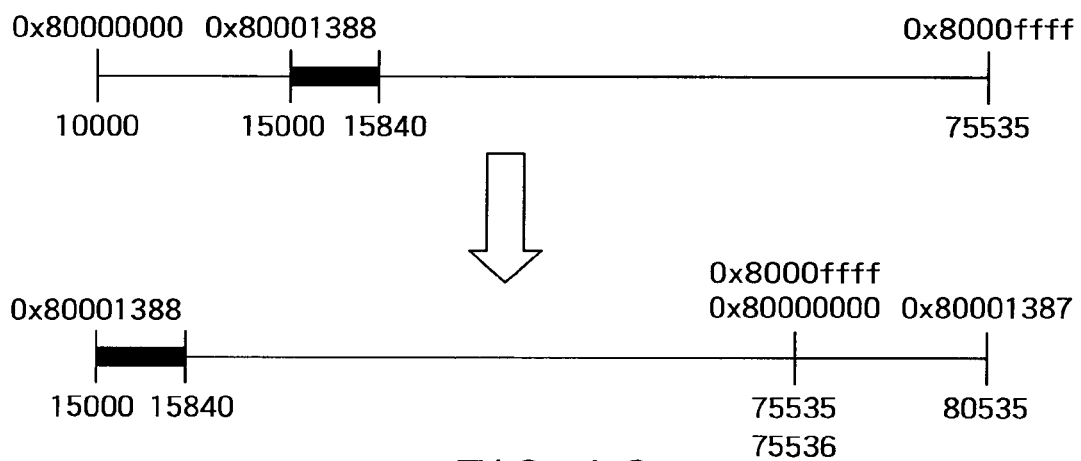
FIG. 19 illustrates a scheme for allocating a temporary buffer area (a second method)

By doing so, although data with sequence numbers from 15000 to 15839 remains in the temporary buffer area at the time of copy completion shown in the second stage in FIG. 14, for example, consistency between area addresses and sequence numbers can be maintained before and after updating without moving the remaining data. This is illustrated in FIG. 19, in which the upper portion represents before updating and the bottom portion represents after updating, and shown above the number line are addresses in the temporary buffer area and shown below are corresponding sequence numbers.

When the temporary buffer area is smaller than a specified destination buffer area, the temporary buffer area does not have to be a ring buffer. Describing this specifically, when the temporary buffer area is from 0x80000000 to 0x800000ff (size: 256 bytes) and if the destination number range is identified again as from 10000 to 14999, the temporary buffer area may continue to be from 0x80000000 through 0x800000ff when data copying is completed. However, the corresponding temporary sequence number range is also updated to follow the destination sequence number, i.e., it becomes from 15000 to 15255.

Such operations as described above enable appropriate allocation of a temporary buffer area.

Third Embodiment

In the second embodiment, determination of reception completion is performed after copying by the data copying unit 15 (S35→S32 in FIG. 6), but data can be received while the data copying unit 15 copies data. As the memory of the data storage 12 typically has one write port, arbitration would be required in that case between write operation for copying and that for data reception and either of them has to be suspended. Since data to be copied is stored in a temporary buffer area, delay of copying may not pose a significant problem. If data reception is delayed, on the other hand, a buffer on the way (especially an internal buffer or the like of the network interface unit 11) may overflow and data may be lost when data is transmitted in sequence. It is accordingly desirable to give higher priority to writing for data reception than that for data copy in such a situation, but in that case data reception often takes place before data copy is completed. A third embodiment addresses such a case.

Figure 7:
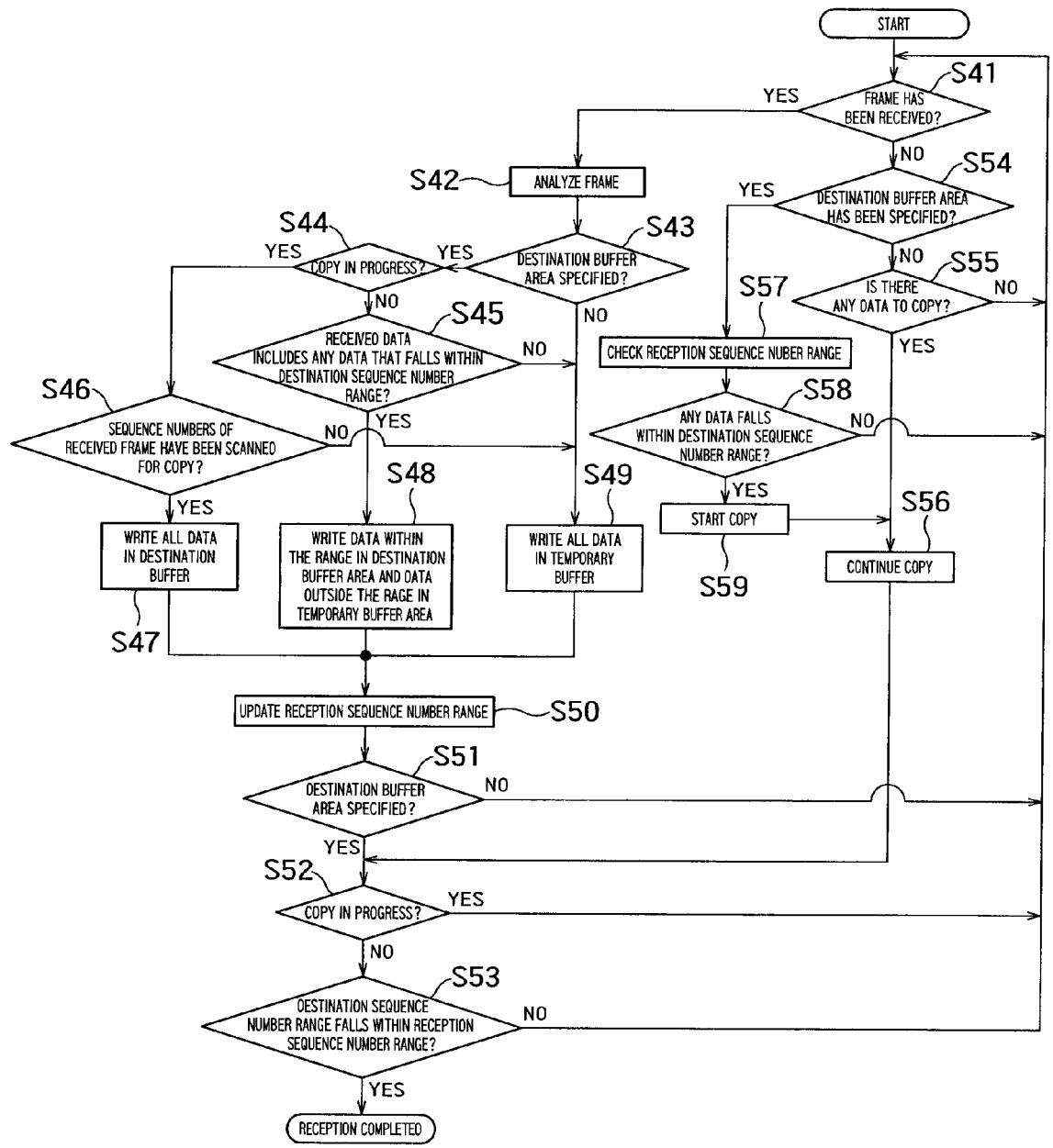
FIG. 7 is a flowchart illustrating an example flow of operations performed by the data receiving apparatus of the third embodiment.

FIG. 7 is a flowchart illustrating the operational flow of the data receiving apparatus according to the third embodiment. A block diagram of the data receiving apparatus according to the third embodiment is similar to the one shown in FIG. 2 or 3.

If data with a destination buffer area specified is received while copy is performed by the data copying unit 15 (YES at S41, YES at S43, and YES at S44), the reception sequence number updater 22 first updates the reception sequence range information in the reception sequence number storage 21 as in the previous embodiments. However, if the data is simply written in the destination buffer area as in the previous embodiments, when the sequence numbers of the data have not been scanned for copy by the data copying unit 15 yet, the reception sequence number range information memorizes reception of data having that sequence numbers. Accordingly, the data copying unit 15 sees the updated reception sequence number range information when subsequently scanning to read data from the corresponding area in the temporary buffer area in which received data is not actually written and copy it to the destination buffer area. In other words, the received data written in the destination buffer area is overwritten with invalid data that happens to be stored in the temporary buffer area at that time.

Accordingly, in such a situation, that is, when data is received while the data copying unit 15 performs copy, if the sequence numbers of the received data have not been scanned for copy by the data copying unit 15 (NO at S46), the received data is written in the temporary buffer area even if a destination buffer area is specified (S49). By doing so, the data will be correctly copied from the temporary buffer area to the destination buffer area when the data copying unit 15 subsequently performs scan. On the other hand, if the sequence numbers of the received data have been scanned for copy by the data copying unit 15 (YES at S46), the received data is written in the destination buffer area because there will be no overwriting associated with copy (S47).

Also, in the second embodiment, the reception completion determining unit 23 determines whether reception is completed if a destination buffer area for storing the sequence number of a frame has been specified when the frame is received. In this embodiment, however, if copy is not completed yet (YES at S52), data indicated by the reception sequence number storage 21 may not be present in the destination buffer area yet and thus the reception completion determining unit 23 does not perform determination even if a destination buffer area is specified. The reception completion determining unit 23 determines whether reception is completed when copy is completed later (S56, NO at S52, and S53).

Figure 15:
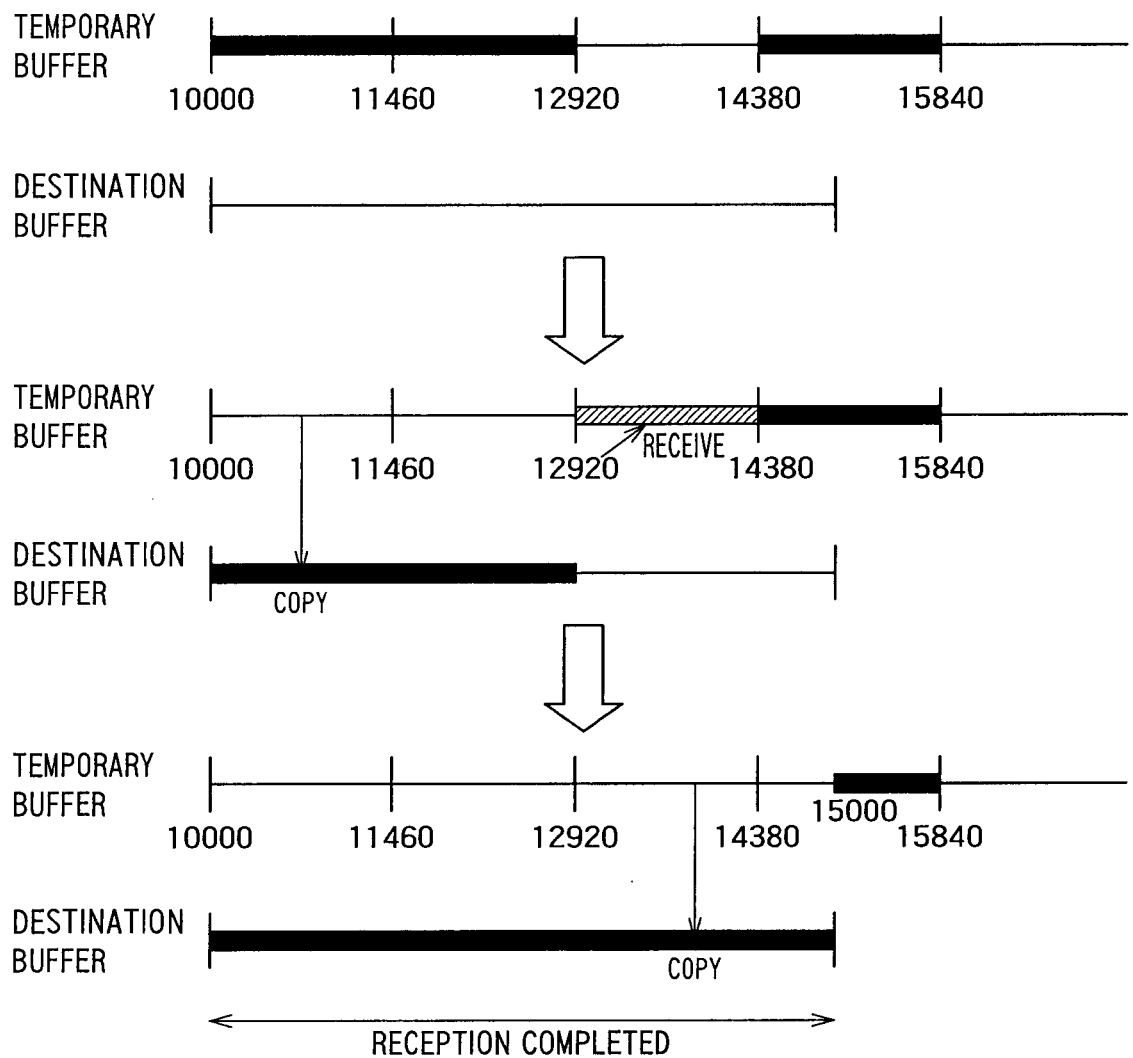
FIG. 15 illustrates the operations of the data receiving apparatus according to the third embodiment.

An example of the above-described operations is shown in FIG. 15. As FIG. 14, FIG. 15 shows a state where a destination buffer area has been specified in the state shown in FIG. 12. However, this figure shows that data having sequence numbers from 12920 to 14379 is newly received when the data copying unit 15 has copied data up to sequence number 12919. Here, because scan by the data copying unit 15 has not passed the received data yet, the data is written in the temporary buffer area and subsequently the data copying unit 15 copies the data to the destination buffer area together with following data, and then the reception completion determining unit 23 determines whether reception is completed. Through such operations, data can be appropriately received even when the data copying unit 15 is copying data.

Fourth Embodiment

In the third embodiment, if data is received while the data copying unit 15 copies data, the data is written in a temporary buffer area if the sequence numbers of the received data have not been scanned yet. However, when the sequence numbers of the received data fall within the destination sequence number range, it is more efficient to write the data directly in the destination buffer area than the temporary buffer area because copy of the data will not be required. The present embodiment describes a data receiving apparatus that realizes it.

Figure 4:
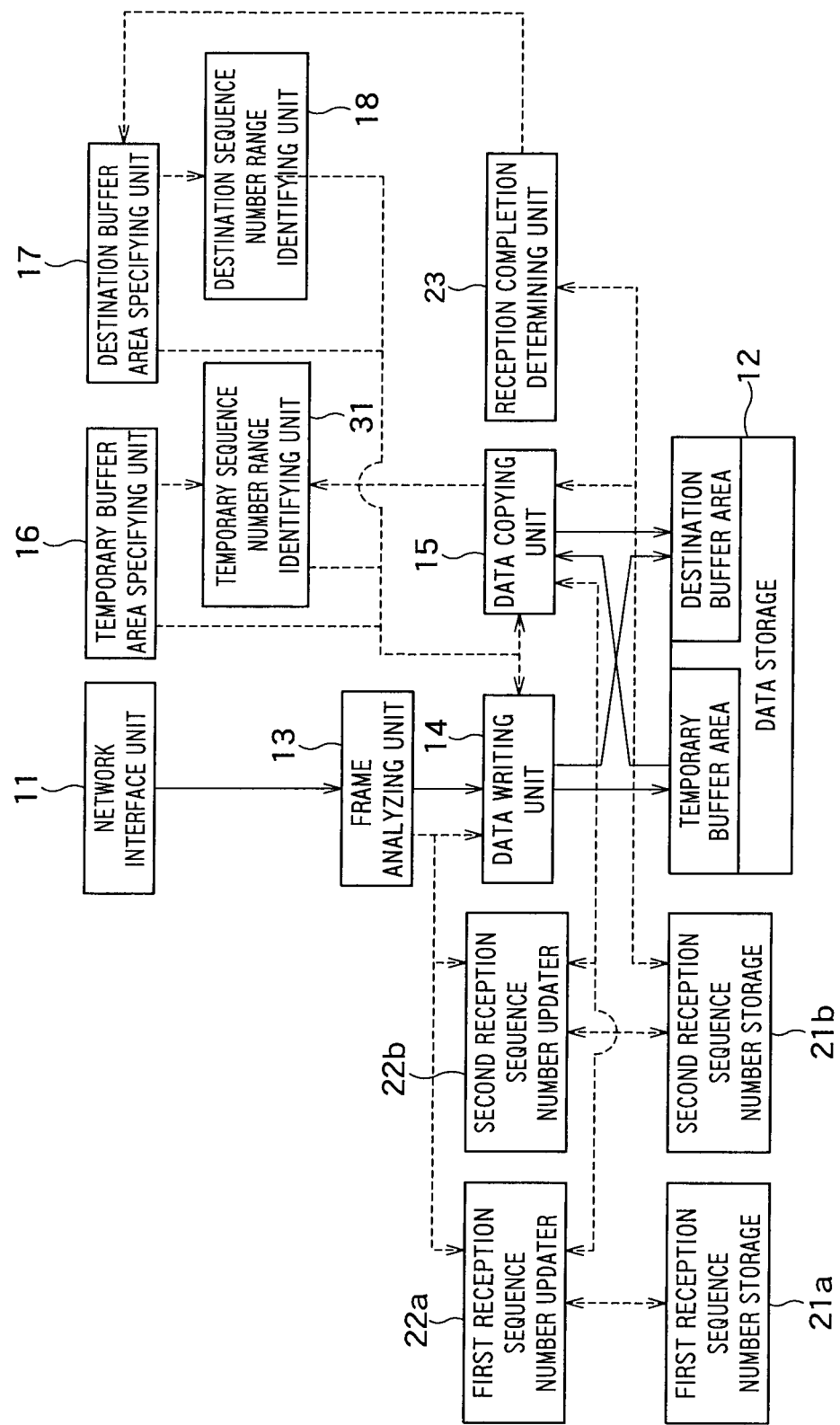
FIG. 4 shows a configuration of a data receiving apparatus according to a fourth embodiment.

FIG. 4 is a block diagram showing a configuration of the data receiving apparatus according to a fourth embodiment of the invention.

The data receiving apparatus of FIG. 4 is different from that of FIG. 3 in that it has two (i.e., first and second) reception sequence number updaters and two (i.e., first and second) reception sequence number storages. That is, the data receiving apparatus of FIG. 4 includes a first reception sequence number storage 21a and a second reception sequence number storage 21b as well as a first reception sequence number updater 22a and a second reception sequence number updater 22b. The first reception sequence number storage 21a stores reception sequence number range information that corresponds to data written in a temporary buffer area. The second reception sequence number storage 21b stores reception sequence number range information that corresponds to data written in a destination buffer area. The first and second reception sequence number updaters 22a and 22b update reception sequence number range information in the first and second reception sequence number storages 21a and 21b. The reception sequence number range information in the first reception sequence number storage 21a corresponds to temporary range information of the present invention, and the reception sequence number range information in the second reception sequence number storage 21b corresponds to destination range information of the present invention, for example.

Since reception sequence number range information corresponding to data stored in the temporary buffer area is stored in the first reception sequence number storage 21a, the data copying unit 15 identifies data to copy by checking the information when copying data. A reception sequence number range corresponding to the copied data is moved from the first reception sequence number storage 21a to the second reception sequence number storage 21b.

When data is newly received, it is determined whether the data should be written in the temporary buffer area or the destination buffer area in the manner described in the first embodiment. The sequence number range of data written in the temporary buffer area is added to the first reception sequence number storage 21a by the first reception sequence number updater 22a, and the sequence number range of data written in the destination buffer area is added to the second reception sequence number storage 21b by the second reception sequence number updater 22b.

When the reception sequence number range information in the second reception sequence number storage 21b is updated upon data copy or reception of new data, the reception completion determining unit 23 checks if the updated reception sequence number range information falls within the destination sequence number range, and determines that reception is completed if the information falls within the range.

Figure 20:
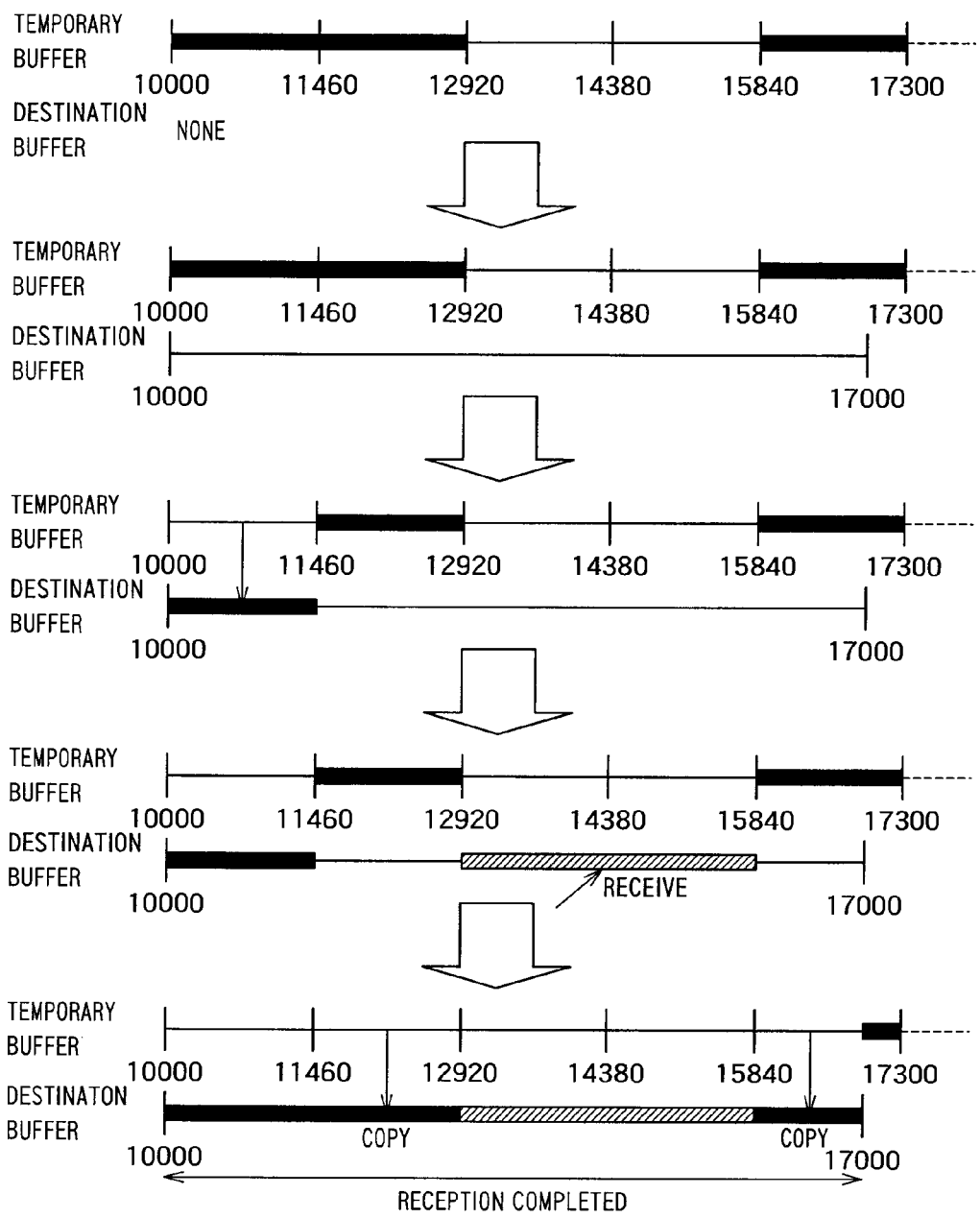
FIG. 20 illustrates the operations of the data receiving apparatus according to a fourth embodiment.

Consider the following case, for example. FIG. 20 shows an example of operations from specification of a destination buffer area to completion of reception.

Suppose that the temporary buffer area first contains data having sequence numbers from 10000 to 12919 and from 15840 to 17299 when sequence numbers start at 10000 (the start of the temporary sequence number range is 10000) and no destination buffer area is specified in the initial state. When a destination buffer area of a destination sequence number range from 10000 to 16999 is specified, the data having sequence numbers from 10000 to 11459 is first copied. Then, copy operation continues, during which data having sequence numbers from 12920 to 15839 is newly received and written in the destination buffer area. Finally, data with sequence numbers from 11460 to 12919 and data from 15840 to 16999, which are remaining data to be copied by the continuing copy operation, are copied. At this point in time, all of the data with sequence numbers 10000 to 16999 has been stored in the destination buffer area. In the following, detailed operations of the data receiving apparatus of this embodiment in the case shown in FIG. 20 will be described.

Figure 8:
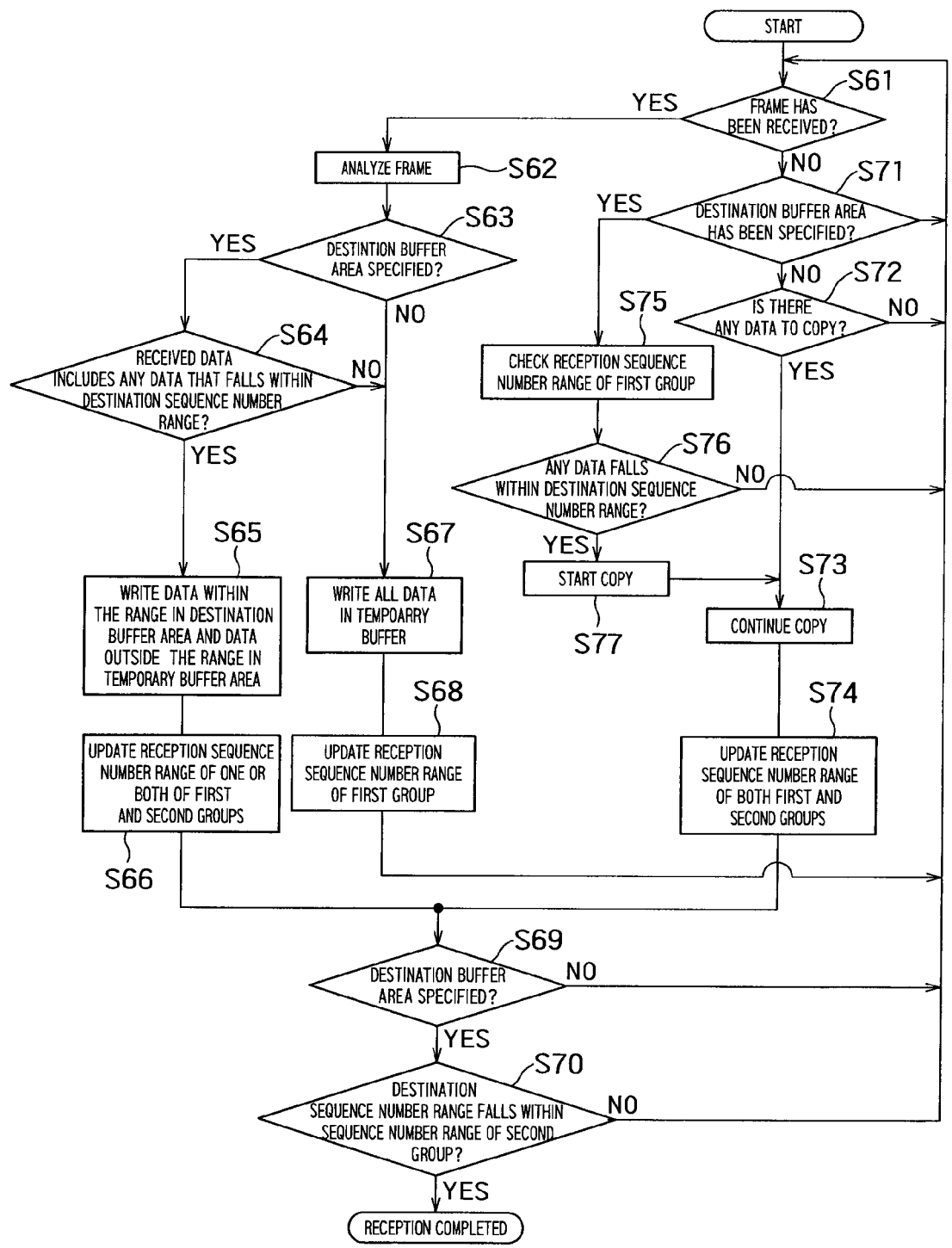
FIG. 8 is a flowchart illustrating an example flow of processing performed by the data receiving apparatus of the fourth embodiment.

FIG. 8 is a flowchart illustrating a flow of processing performed by the data receiving apparatus according to the fourth embodiment. For the sake of convenience, it is hereinafter assumed that reception sequence number range information stored in the first reception sequence number storage 21a belongs to a first group and that stored in the first reception sequence number storage 21b to a second group.

Figure 21:
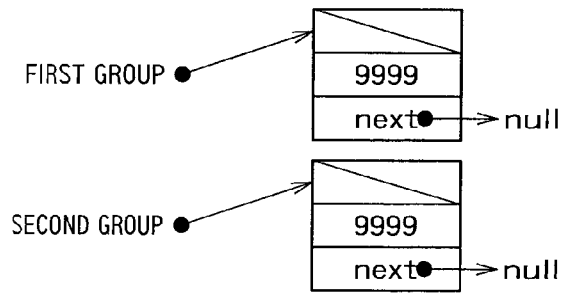
FIG. 21 illustrates the operations of the data receiving apparatus according to the fourth embodiment.
Figure 22:
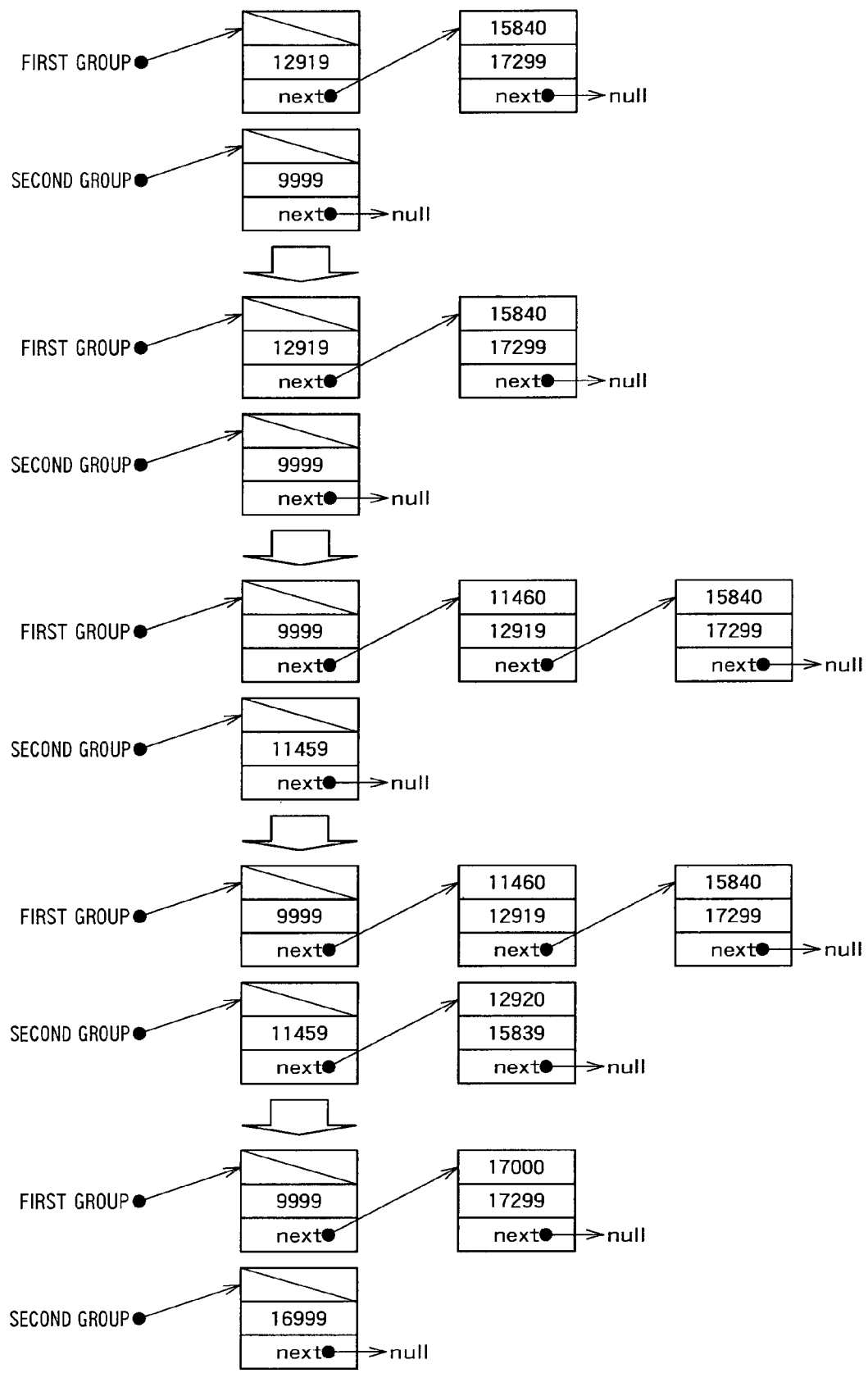
FIG. 22 illustrates the operations of the data receiving apparatus according to the fourth embodiment.

First, reception sequence number information in the initial state is shown in FIG. 21. In this state, no data has been received yet. When data having sequence numbers from 10000 to 12919 and data from 15840 to 17299 are received in this state (YES at S61), the state changes to the first state of FIG. 20 (S62, NO at S63, and S67). Reception sequence number range information corresponding to FIG. 20 is shown in FIG. 22. Each stage of FIG. 22 corresponds to each stage of FIG. 20. In the initial state, reception sequence number range information for sequence numbers up to 12919 and sequence numbers from 15840 to 17299 is stored in the first group (S68). It is recognized that data starts at 10000 because start of range information identified by the temporary sequence number range identifying unit 31 indicates 10000. As there is no destination buffer area, no reception sequence number range information is present in the second group.

Next, a destination buffer area is specified (NO at S61, and YES at S71). However, the reception sequence number range information does not change even upon the specification.

Then, when data having sequence numbers from 10000 to 11459 is copied (S75, YES at S76, S77, and S73), this sequence number range is deleted from the first group and added to the second group. As a result, sequence numbers up to 9999, from 11460 to 12919, and from 15840 to 17299 are in the first group, and sequence numbers up to 11459 are in the second group (S74). At this point, the reception completion determining unit 23 checks if the destination sequence number range from 10000 to 16999 falls within the reception sequence number range information of the second group (YES at S69, S70). However, the range does not fall within in the range information here (NO at S70), thus it is not determined that reception is completed.

When data having sequence numbers from 12920 to 15839 is newly received (YES at S61), that range is added to the second group and consequently sequence numbers up to 11459 and from 12920 to 15839 are in the second group (S62, YES at S63, YES at S64, S65, and S66). The reception completion determining unit 23 again checks whether the destination sequence number range from 10000 to 16999 falls within the reception sequence number range information of the second group (YES at S69, S70). However, the range does not still fall within the range information (NO at S70), thus it is not determined that reception is completed.

Then, when data with sequence numbers from 11460 to 12919 and data from 15840 to 16999, which are remaining data to be copied, are copied (S73), those portions are deleted from the first group. As a result, the first group contains sequence numbers up to 9999 and from 17000 to 17299, and the second group contains sequence numbers up to 16999 (S74). At this point, the reception completion determining unit 23 again checks if the destination sequence number range from 10000 to 16999 falls within the reception sequence number range information of the second group (YES at S69, S70). The range does fall within the range information here (YES at S70), the reception completion determining unit 23 determines that reception is completed.

Figure 23:
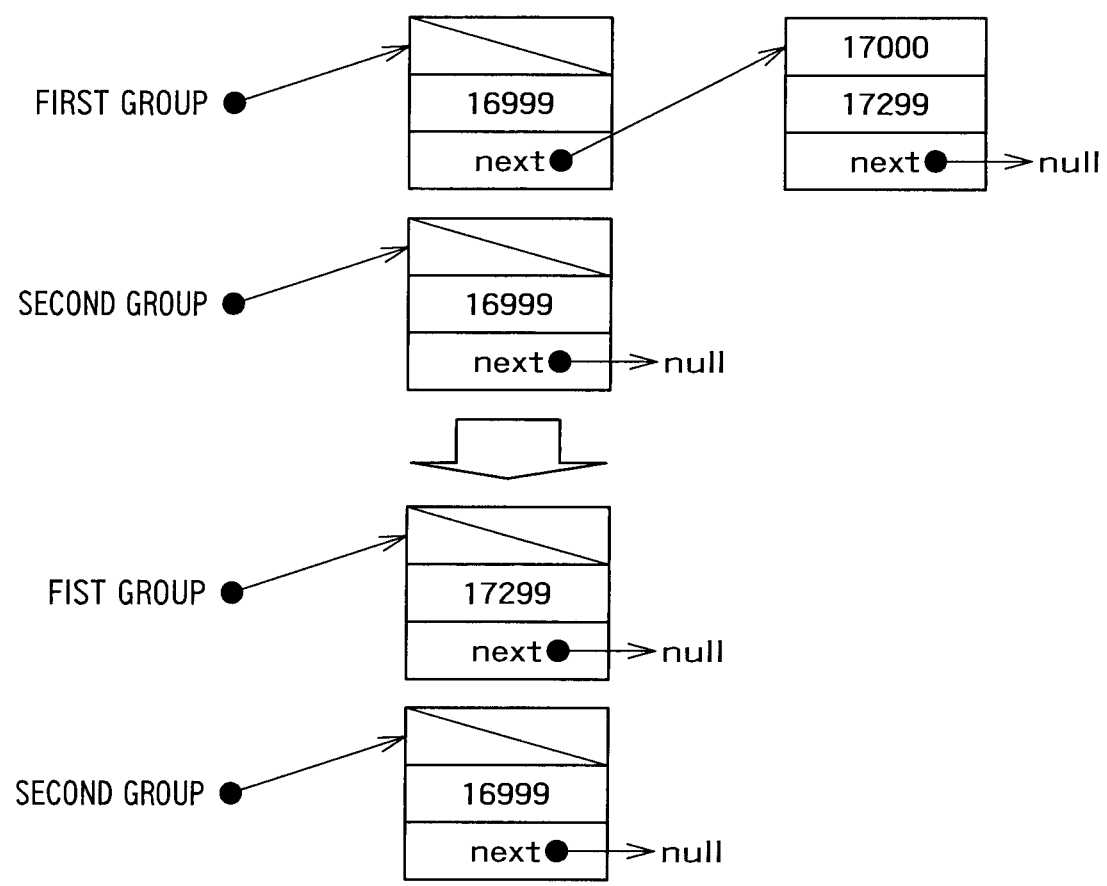
FIG. 23 illustrates the operations of the data receiving apparatus according to the fourth embodiment.

After completion of data copy, it is desirable that a portion of the temporary buffer area from which the data has been copied be released because it is no longer necessary as mentioned in the end of the second embodiment, for example. With such release, corresponding reception sequence number range information of the first group also becomes unnecessary and thus may also be deleted as shown in FIG. 23, for example. That is, in the upper portion of FIG. 23, the end sequence number of the first reception sequence number range information of the first group is 16999, which indicates deletion of information on the sequence number range from 10000 to 16999 from the last state in FIG. 22. Furthermore, as this range is consecutive to the second reception sequence number range of 17000 to 17299, these ranges can be merged into a reception sequence number range up to 17299 as shown in the bottom portion. Here, the start of the temporary number range also becomes 17000, which shows that data starts at 17000. In such a state, specification of a new destination buffer area and/or data reception are awaited.

Through operations as described above, when new data is received during data copy by the data copying unit 15, copying of the data can be avoided and efficiency of processing can be improved by writing the data directly in the destination buffer area instead of the temporary buffer area.

Figure 24:
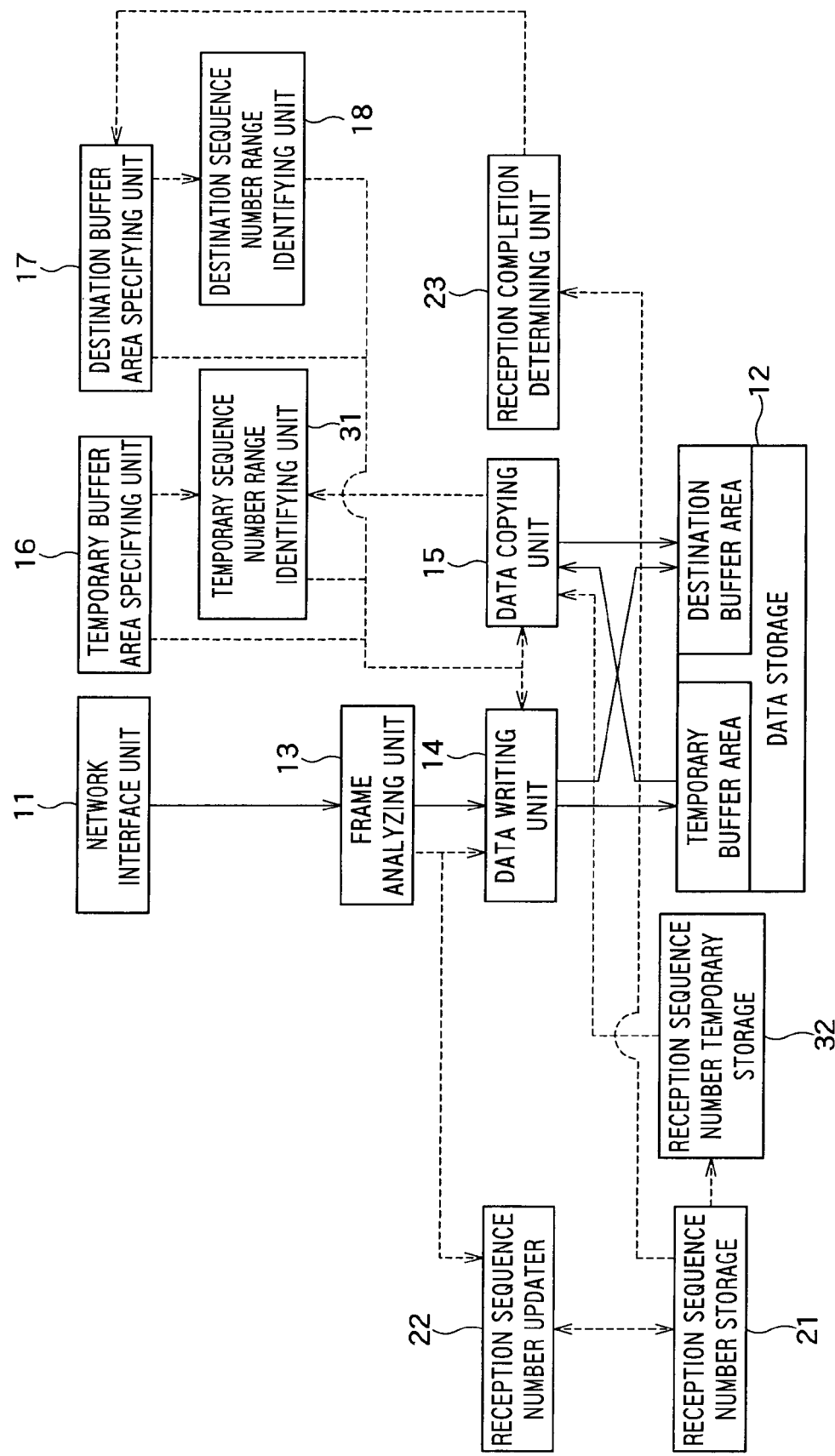
FIG. 24 shows another configuration of the data receiving apparatus according to the fourth embodiment.

Another mode which can provide effects equivalent to the above-described embodiment is now described. A configuration of the data receiving apparatus according to the mode is shown in FIG. 24. When compared with FIG. 2 or 3, FIG. 24 includes a reception sequence number temporary storage (a reception sequence number temporary storage) 32 for temporarily storing reception sequence number range information.

Figure 25:
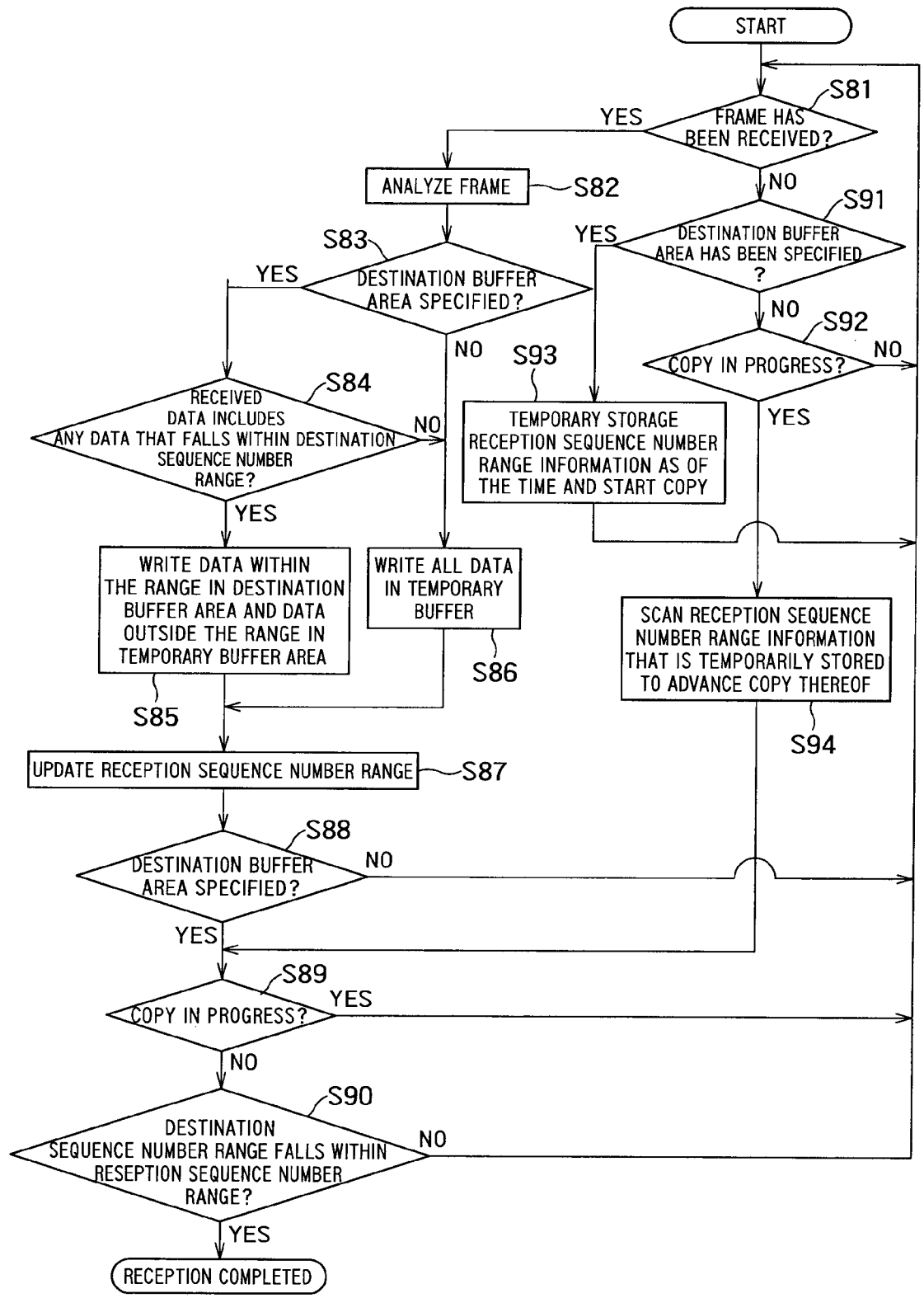
FIG. 25 is a flowchart illustrating the flow of operations by the data receiving apparatus of FIG. 24.

A flow of processing by the data receiving apparatus of FIG. 24 is shown in FIG. 25. Operations performed upon data reception are similar to processing in the second embodiment, but processing after specification of a destination buffer area is different.

When a destination buffer area is specified and destination sequence range information is identified (YES at S91), the reception sequence number temporary storage 32 stores reception sequence number range information as of the time (S93). The data copying unit 15 then sequentially scans reception sequence number range information stored in the reception sequence number temporary storage 32, rather than that stored in the reception sequence number storage 21, to copy data that falls within the destination sequence number range (S93).

If data is newly received during data copy (YES at S81), information stored in the reception sequence number storage 21 is updated with information on the data (S87), but the information does not affect information in the reception sequence number temporary storage 32 referenced by the data copying unit 15 and therefore does not affect copy.

If copy is completed (NO at S89) and if the destination sequence range information falls within the reception sequence number range information (YES at S90), it is determined that reception is completed.

Figure 26:
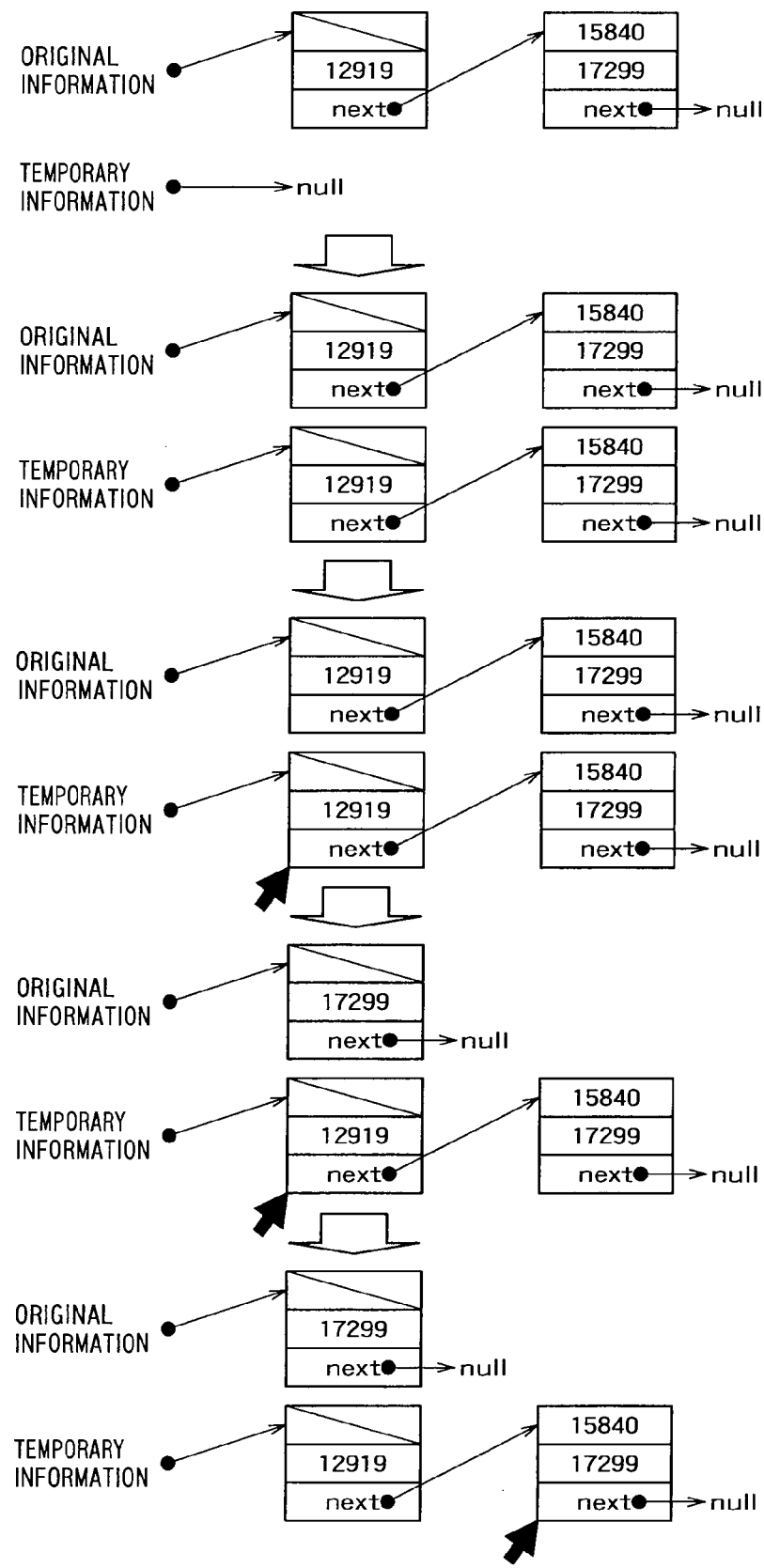
FIG. 26 illustrates the operations of the data receiving apparatus of FIG. 24.

Change in reception sequence number range information corresponding to FIG. 20 is illustrated in FIG. 26. "Original information" is information stored in the reception sequence number storage 21 and "temporary information" is information stored in the reception sequence number temporary storage 32.

First, in a stage where a destination buffer area is not specified (the first stage), there is no data in the temporary information. If data that was used in the last processing remains in the temporary information at this point, the data will be overwritten by copy in the next stage.

When a destination buffer area is specified (the second stage), reception sequence number range information is stored in the temporary information at this point and data copy is started. Copy is sequentially performed with reference to temporary information: the first reception sequence number range information is first scanned and copy is performed (the third stage).

Next, when data is newly received (the fourth stage), information on the data is reflected in the original information but not in the temporary information, thus the information does not affect copy. At this point in time, the destination sequence number range comes to fall within reception sequence number range information, but reception is not determined to be completed because copy is not completed yet.

Thereafter, copy is continued to scan the last reception sequence number range information (the fifth stage), upon which copy is completed and reception is determined to be completed.

Through such operations, when new data is newly received during data copy by the data copying unit 15, copying of the data can be avoided and efficiency of processing can be improved by writing the data directly in the destination buffer area instead of the temporary buffer area, as in the previous embodiment.

Fifth Embodiment

Figure 27:
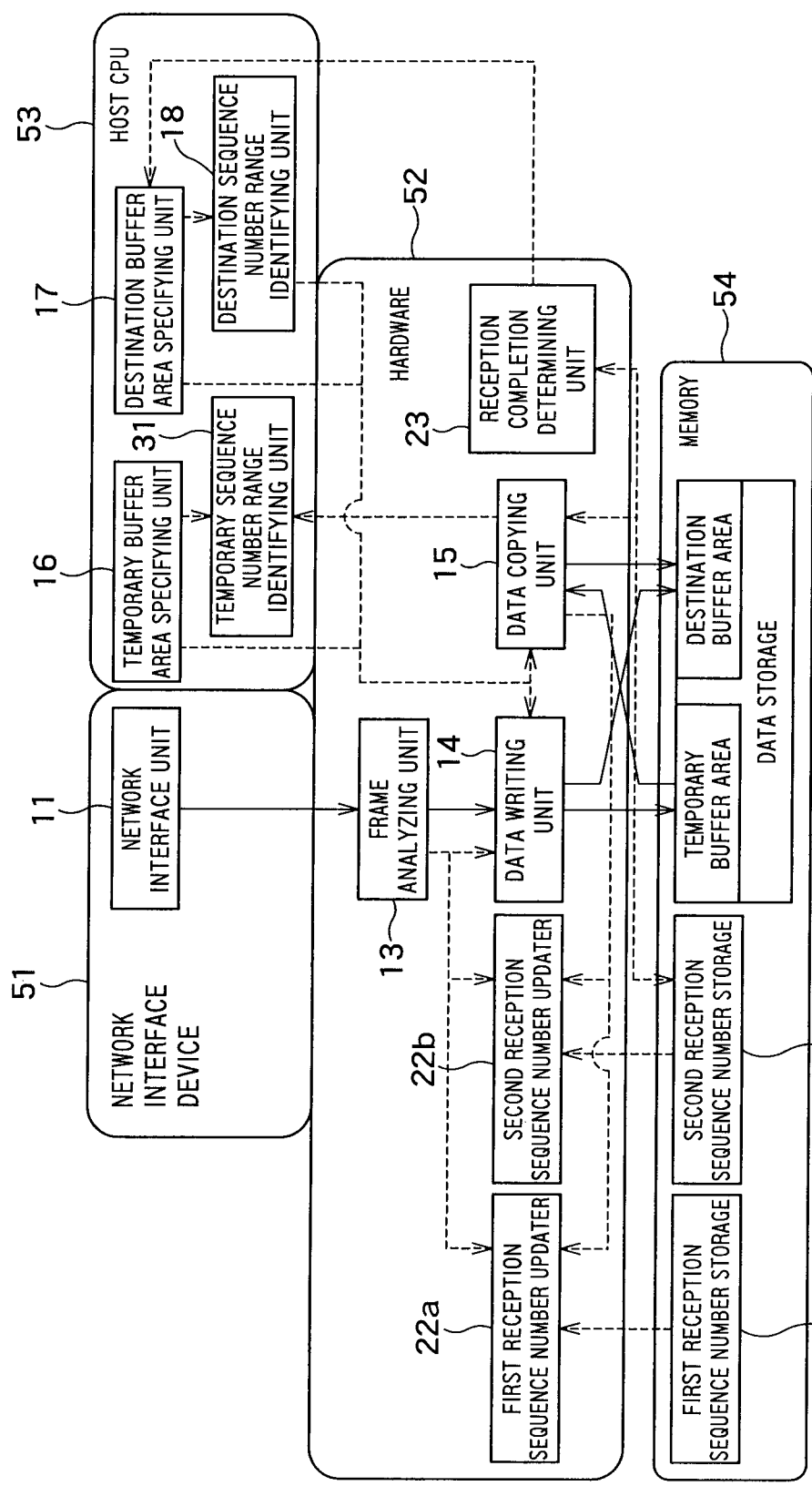
FIG. 27 shows a specific example of implementation of a data receiving apparatus.

In a fifth embodiment, a specific form of implementation is described. FIG. 27 shows an example thereof.

The network interface unit 11 is realized by a network interface device such as a Network Interface Card (NIC).

The frame analyzing unit 13, data writing unit 14, data copying unit 15, first and second sequence number updating units 22a and 22b, and reception completion determining unit 23 are realized in hardware (dedicated circuitry) 52 which is implemented as a dynamic reconfigurable processor, FPGA, or the like.

The temporary buffer area specifying unit 16, temporary sequence number range identifying unit 31, destination buffer area specifying unit 17, destination sequence number range identifying unit 18 and so forth are realized in software that is executed by a host CPU 53 or the like.

The first and second reception sequence number storages 21a, 21b, and data storage 12 are realized in memory 54, such as SDRAM and SRAM. The memory may be physically configured as multiple memory devices or a single memory device. When the memory is configured as multiple memory devices, they may be independent memory devices.

The above-described configuration is merely an example, but at least the frame analyzing unit 13, data writing unit 14, data copying unit 15, and first and second reception sequence number updater 22a and 22b are desirably configured in hardware because processing is required each time a frame is received.

Figure 28:
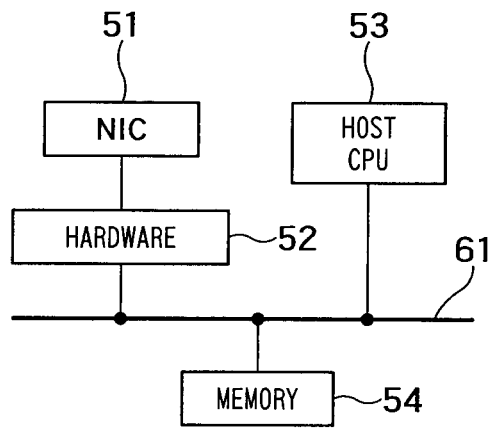
FIG. 28 shows an exemplary arrangement of a host CPU, a NIC, hardware, and memory.
Figure 29:
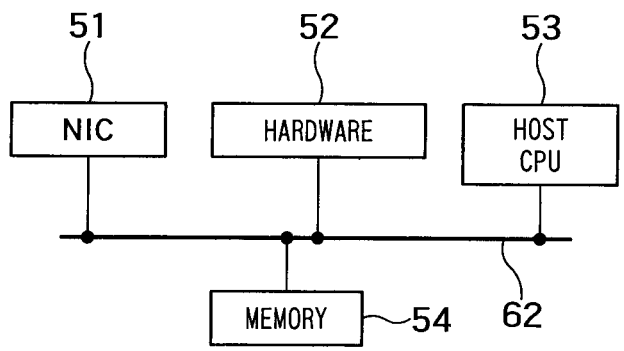
FIG. 29 shows another exemplary arrangement of a host CPU, a NIC, hardware, and memory.
Figure 30:
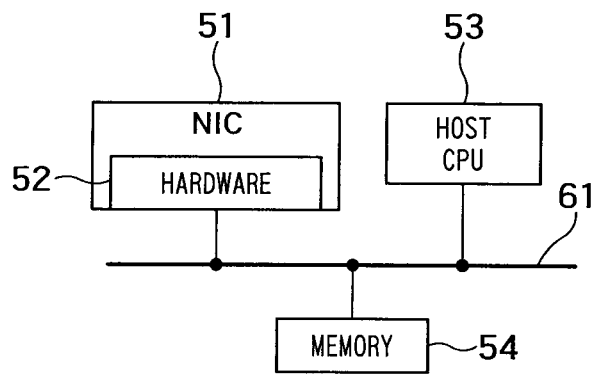
FIG. 30 shows yet another exemplary arrangement of a host CPU, a NIC, hardware, and memory.
Figure 31:
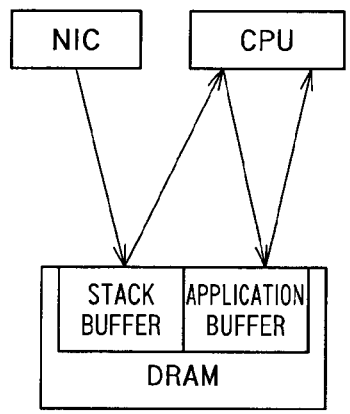
FIG. 31 illustrates operations of a conventional data receiving apparatus.
Figure 32:
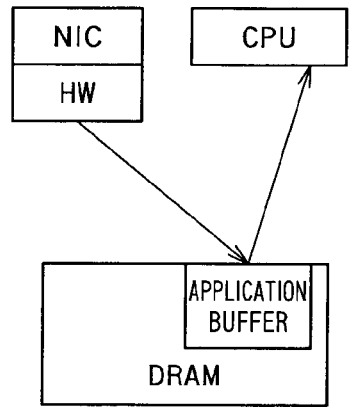
FIG. 32 illustrates operations of a conventional data receiving apparatus.
Figure 33:
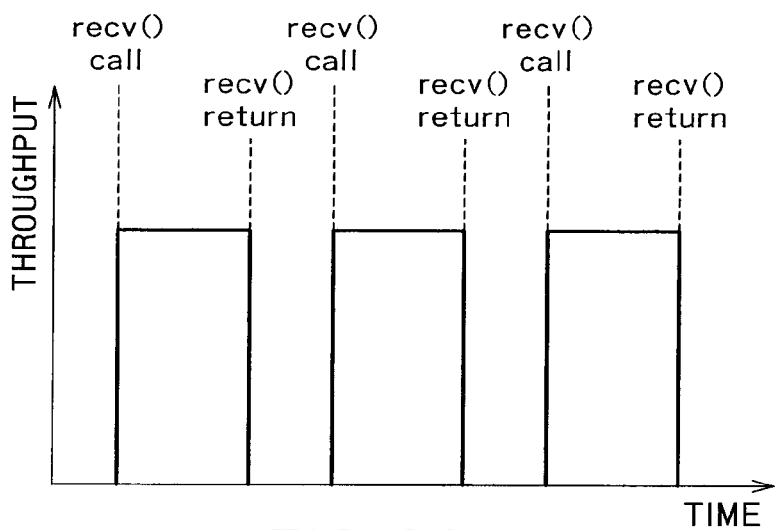
FIG. 33 illustrates operations of a conventional data receiving apparatus.

Also, exemplary arrangements of the host CPU 53, NIC 51, hardware 52, and memory 54 are shown in FIGS. 28 to 30. FIG. 28 shows a case where the hardware 52 is connected with the NIC 52 by a dedicated bus 61; FIG. 29 a case where they are connected by a shared bus 62; and FIG. 30 a case where the hardware 52 is implemented in the NIC 51. The present invention is applicable to any of these cases.

They may be configured in different LSIs, or multiple blocks such as the hardware and the host CPU may be configured in a single LSI.

When the temporary buffer area and the destination buffer area are configured in common memory, three accesses in total, i.e., for writing of received data, reading by copy, and writing by copy can be simultaneously required. It is thus desirable the bandwidth of the memory be at least three times that of the network.

As has been described, using the embodiments of the present invention, received data can be temporarily buffered as much as needed or directly written in a destination buffer area when it does not require buffering. Therefore, the problems (1) to (3) mentioned in Related Art can be solved while minimizing copy of received data to the temporary buffer area, which in turn realize improved performance and reduced power consumption.

What is claimed is:

1. A data receiving apparatus, comprising:
a receiving unit configured to receive via a network a frame including a header and a data sequence which is a series of data, a sequence number being associated with each data in the data sequence;
a data storage configured to store data;
a first specifying unit configured to specify a temporary buffer area in the data storage for temporarily storing data of the data sequence included in the received frame;
a second specifying unit configured to specify a destination buffer area in the data storage for storing data of the data sequence included in the received frame;
a first identifying unit configured to, when the destination buffer area is specified by the second specifying unit, identify a destination number range depending on a size of the specified destination buffer area so that the destination number range follows a destination number range that was last identified, each sequence number included in an identified destination number range being assigned to a position in the specified destination buffer area that corresponds to a relative position of the sequence number within the identified destination number range;
a data writing unit configured to, when the frame including the header and the data sequence has been received by the receiving unit, write a part of the data sequence included in the received frame that falls within one of destination number ranges which has been identified by the first identifying unit in an assigned position in the destination buffer area that corresponds to the sequence number of that data, and write remaining data of the data sequence included in the received frame that does not fall within any of the destination number ranges in the temporary buffer area; and
a data copying unit configured to, when a destination buffer area is newly specified by the second specifying unit, read out data, from the temporary buffer area, that has a sequence number which falls within a destination number range newly identified by the first identifying unit for the newly specified destination buffer area so as to follow said destination number ranges which have been identified by the first identifying unit and write the read-out data at an assigned position in the newly specified destination buffer area that corresponds to the sequence number of the read-out data.

2. The apparatus according to claim 1, further comprising:
a sequence number storage configured to store reception range information that represents a set of sequence number ranges of data sequences received by the receiving unit;
a sequence number updater configured to, when the data sequence is to be written by the data writing unit, update the reception range information by adding the sequence number range of the data sequence to be written; and
a determining unit configured to check whether the identified destination number range falls within the reception range information or not, and, if it is detected that the range falls in the information, determine that reception is completed for the identified destination number range, wherein
in a case that data copy is performed by the data copying unit in response to specification of the destination buffer area, the determining unit determines that reception has completed after the data copy terminates even if it is detected that the identified destination number range falls within the reception range information, and
the data copying unit identifies a sequence number that falls within both a sequence number range indicated by the reception range information and the identified destination number range, and copies data that has the identified sequence number.

3. The apparatus according to claim 2, wherein
the data copying unit sequentially scans the reception range information and copies data that falls within the identified destination number range, and
when data that falls within the identified sequence number range is received while data copy is performed by the data copying unit, if the sequence number of the data has not been scanned yet, the data writing unit writes the data in the temporary buffer area, and if the sequence number of the data has been scanned, writes the data at an assigned position in the destination buffer area that corresponds to the sequence number of the data.

4. The apparatus according to claim 2, wherein
the sequence number storage stores temporary range information that represents the sequence number range of data written in the temporary buffer area and destination range information that represents the sequence number range of data written in the destination buffer area, as the reception range information,
the sequence number updater adds the sequence number range of data written in the destination buffer area to the destination range information and adds the sequence number range of data written in the temporary buffer area to the temporary range information, the data copying unit identifies a sequence number that falls within both a sequence number range indicated by the temporary range information and the identified sequence number range, and copies data having the identified sequence number, when data copy is performed by the data copying unit, the sequence number updater moves the sequence number range of copied data from the temporary range information to the destination range information, and the determining unit determines that the reception has completed for the identified destination number range when it is detected that the identified destination number range falls within the destination range information.

5. The apparatus according to claim 2, further comprising a sequence number temporary storage configured to store the reception range information as of the time when the first identifying unit has identified a destination number range, wherein the data copying unit sequentially scans reception range information stored in the sequence number temporary storage and copies data that falls within the identified destination number range.

6. The apparatus according to claim 2, wherein the temporary buffer area includes a plurality of partial areas each of which has a maximum size of the data sequence that can be received via the network;

the data writing unit writes in an available one of the plurality of partial areas when writing in the temporary buffer area;

when the data have been written in the available partial area, the sequence number storage stores addresses at which the data are written, the addresses being associated with the sequence number range of the data in the reception range information; when the data copying unit has identified the sequence number of data to be copied, the data copying unit identifies an address that corresponds to the identified sequence number based on the reception range information, and reads data stored at the identified address as the data to be copied; and the first specifying unit releases the partial area when copy of all data written in the partial area is completed.

7. The apparatus according to claim 2, further comprising a second identifying unit configured to, every time the destination number range is identified in response to specification of the destination buffer area and further the copy is completed, identify a temporary number range corresponding to the temporary buffer area so that the temporary number range follows the identified destination number range, wherein when writing data in the temporary buffer area, the data writing unit writes the data at a position corresponding to the relative position of the data within the temporary number range, and the data copying unit identifies data stored at a position corresponding to the relative position of the identified sequence number in the temporary number range, as the data to be copied.

8. The apparatus according to claim 1, wherein at least the data writing unit and the data copying unit are configured in hardware.

9. The apparatus according to claim 1, further comprising a buffer size informer configured to inform a sender of the data sequence of the size of an available area out of a sum total of the destination buffer areas and the temporary buffer area.

10. The apparatus according to claim 1, wherein
the data storage is a single memory device, and
a bandwidth of the memory device is at least three times the bandwidth of the network.

11. The apparatus according claim 1, wherein each data in the data sequence is byte data in a data portion of a TCP packet.

12. A data receiving method, comprising:

receiving via a network a frame including a header and a data sequence which is a series of data, a sequence number being associated with each data in the data sequence;

specifying a temporary buffer area for temporarily storing data of the data sequence included in the received frame, in a data storage configured to store data;

specifying a destination buffer area in the data storage for storing data of the data sequence included in the received frame;

when the destination buffer area is specified, identifying a destination number range depending on a size of the specified destination buffer area so that the destination number range follows a destination number range that was last identified, each sequence number included in an identified destination number range being assigned to a part of the specified destination buffer area that is associated with a relative position of the sequence number within the identified destination number range;

when the frame including the header and the data sequence has been received, writing a part of the data sequence included in the received frame that falls within one of destination number ranges which has been identified in an assigned position in the destination buffer area that corresponds to the sequence number of that data, and writing remaining data of the data sequence included in the received frame that does not fall within any of the destination number ranges in the temporary buffer area; and when a destination buffer area is newly specified, reading out data, from the temporary buffer area, that has a sequence number which falls within a destination number range newly identified for the newly specified destination buffer area so as to follow said destination number ranges which have been identified and writing the read-out data in an assigned position in the newly specified destination buffer area that corresponds to the sequence number of the read-out data.

13. A non-transitory storage medium storing a computer program for causing a computer to execute instructions to perform the steps of:

receiving via a network a frame including a header and a data sequence which is a series of data, a sequence number being associated with each data in the data sequence;

specifying a temporary buffer area for temporarily storing data of the data sequence included in the received frame, in a data storage configured to store data;

specifying a destination buffer area in the data storage for storing data of the data sequence included in the received frame;

when the destination buffer area is specified, identifying a destination number range depending on a size of the specified destination buffer area so that the destination number range follows a destination number range that was last identified, each sequence number included in an identified destination number range being assigned to a part of the specified destination buffer area that is associated with a relative position of the sequence number within the identified destination number range;

when the frame including the header and the data sequence has been received, writing a part of the data sequence included in the received frame that falls within one of destination number ranges which has been identified in an assigned position in the destination buffer area that corresponds to the sequence number of that data, and writing remaining data of the data sequence included in the received frame that does not fall within any of the destination number ranges in the temporary buffer area; and when a destination buffer area is newly specified, reading out data, from the temporary buffer area, that has a sequence number which falls within a destination number range newly identified for the newly specified destination buffer area so as to follow said destination number ranges which have been identified and writing the read-out data in an assigned position in the newly specified destination buffer area that corresponds to the sequence number of the read-out data.

14. A data processing apparatus, the apparatus processing a frame including a header and a data sequence via a network, the data sequence in the frame being a series of data, a sequence number being associated with each data in the data sequence, comprising:

a first specifying unit configured to specify a temporary buffer area in a data storage for temporarily storing data of the data sequence included in the received frame;

a second specifying unit configured to specify a destination buffer area in the data storage for storing data of the data sequence included in the received frame;

a first identifying unit configured to, when the destination buffer area is specified by the second specifying unit, identify a destination number range depending on a size of the specified destination buffer area so that the destination number range follows a destination number range that was last identified, each sequence number included in an identified destination number range being assigned to a position in the specified destination buffer area that corresponds to a relative position of the sequence number within the identified destination number range;

a data writing unit configured to, when the frame including the header and the data sequence has been received, write a part of the data sequence included in the received frame, that falls within one of destination number ranges which has been identified by the first identifying unit, in an assigned position in the destination buffer area that corresponds to the sequence number of that data, and write remaining data of the data sequence included in the received frame, that does not fall within any of the destination number ranges, in the temporary buffer area; and a data copying unit configured to, when a destination buffer area is newly specified by the second specifying unit, read out data, from the temporary buffer area, that has a sequence number which falls within a destination number range newly identified by the first identifying unit for the destination buffer area newly specified so as to follow said destination number ranges which have been identified by the first identifying unit and write the read-out data at an assigned position in the newly specified destination buffer area that corresponds to the sequence number of the read-out data.

15. A non-transitory storage medium storing a computer program for processing a frame including a header and a data sequence via a network, the data sequence included in the frame being a series of data, a sequence number being associated with each data in the data sequence, the program causing a computer to execute instructions to perform the steps of:

specifying a temporary buffer area for temporarily storing data of the data sequence included in the received frame, in a data storage configured to store data;

specifying a destination buffer area in the data storage for storing data of the data sequence included in the received frame;

when the destination buffer area is specified, identifying a destination number range depending on a size of the specified destination buffer area so that the destination number range follows a destination number range that was last identified, each sequence number included in an identified destination number range being assigned to a part of the specified destination buffer area that is associated with a relative position of the sequence number within the identified destination number range;

when the frame including the header and the data sequence has been received, writing a part of the data sequence included in the received frame, that falls within one of destination number ranges which has been identified, in an assigned position in the destination buffer area that corresponds to the sequence number of that data, and writing remaining data of the data sequence included in the received frame, that does not fall within any of the destination number ranges, in the temporary buffer area; and when a destination buffer area is newly specified, reading out data, from the temporary buffer area, that has a sequence number which falls within a destination number range newly identified so as to follow said destination number ranges which have been identified in response to newly specifying the destination buffer area and writing the read-out data in an assigned position in the newly specified destination buffer area that is associated with the sequence number of the read-out data.

\* \* \* \* \*